(12) United States Patent
Livingston

(10) Patent No.: US 7,733,930 B2
(45) Date of Patent: Jun. 8, 2010

(54) ERROR CONTROL FOR HIGH-POWER LASER SYSTEM EMPLOYING DIFFRACTIVE OPTICAL ELEMENT BEAM COMBINER WITH TILT ERROR CONTROL

(75) Inventor: Peter M. Livingston, Palos Verdes Estates, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 243 days.

(21) Appl. No.: 11/784,940

(22) Filed: Apr. 10, 2007

(65) Prior Publication Data

US 2008/0253417 A1    Oct. 16, 2008

(51) Int. Cl.
  *H01S 3/13*    (2006.01)
  *H01S 3/08*    (2006.01)
(52) U.S. Cl. .................................. 372/30; 372/102
(58) Field of Classification Search ............... None
  See application file for complete search history.

(56) References Cited

U.S. PATENT DOCUMENTS

| 3,731,103 | A | * | 5/1973 | O'Meara ............... 250/203.2 |
| 3,825,845 | A | * | 7/1974 | Angelbeck et al. ......... 359/349 |
| 4,649,351 | A | * | 3/1987 | Veldkamp et al. ............ 372/18 |
| 4,839,884 | A | * | 6/1989 | Schloss ................ 372/46.012 |
| 5,237,287 | A | * | 8/1993 | Bar-David ................. 329/308 |
| 7,468,832 | B2 | * | 12/2008 | Rothenberg et al. .... 372/29.016 |
| 2005/0128554 | A1 | * | 6/2005 | Wickham et al. .......... 359/237 |

\* cited by examiner

*Primary Examiner*—Minsun Harvey
*Assistant Examiner*—Sean Hagan
(74) *Attorney, Agent, or Firm*—Carmen Patti Law Group, LLC

(57) ABSTRACT

A high-power laser system includes a laser master oscillator, a plurality of fiber laser amplifiers producing intermediate output beamlets, a diffractive optical element for combining the intermediate beamlets into a combined output beam, and one or more error controllers for minimizing errors related to beam combination that may degrade the quality of the combined output beam. A piston error controller uses phase modulation to tag each non-reference intermediate beamlet with a unique dither signal harmonically unrelated to those used for the other beamlets. For each intermediate beamlet, the associated piston error is recovered using a synchronous detector, and an error control signal proportional to the piston error is supplied to a phase modulator to control the piston error for that beamlet. A tilt error controller uses amplitude modulation based on Hadamard code words to tag each non-reference intermediate beamlet with a unique code sequence orthogonal to those used for the other beamlets. For each intermediate beamlet, the associated tilt error is recovered using a Hadamard decoder, and an error control signal proportional to the tilt error is supplied to a beam steerer to control the tilt error for that beamlet.

23 Claims, 9 Drawing Sheets

$310 \sim T(x) = e^{i\Phi(x)}$ $312 \sim \Phi(x) = -1.663 \sin(2\pi f_0 x) + 0.667 \sin(2\pi f_1 x)$

ERROR CONTROL FOR HIGH-POWER LASER SYSTEM EMPLOYING DIFFRACTIVE OPTICAL ELEMENT BEAM COMBINER WITH TILT ERROR CONTROL

TECHNICAL FIELD

This invention relates generally to lasers, and more particularly to arrays of fiber laser amplifier in which multiple output beams from fiber amplifiers are combined to produce a higher-powered output beam.

BACKGROUND

Optical fiber laser amplifiers are a known technology for producing a coherent output beam of intermediate power. A variety of factors, including Stimulated Brillouin Scattering, four wave mixing, and optical damage, limit the output power of a single fiber amplifier to the range of several hundred W. Although a laser of this power output may be useful in a variety of applications, other applications require higher output power than that available from a single fiber amplifier.

Higher powered laser systems have been constructed by assembling an array of fiber amplifiers driven by a master oscillator. The output beams from each of the fiber amplifiers are combined to produce a nominally single output beam. In general, in order for the combined beam to have good beam quality, the individual beams must be substantially parallel and collinear.

A variety of approaches have been used to combine the beams from multiple fiber amplifiers. Most of these employ lenses and prisms. One known approach employs a lenslet array, a precision-manufactured array of small lenses, typically on a single substrate, to combine the several beams into a single powerful beam.

The use of a lenslet array to combine the beams from several fiber amplifiers has several disadvantages. Systems using a lenslet array are difficult to align. Also, the lenslet array substantially attenuates each of the individual beams, because the individual beamlets unavoidably overfill the lenslet aperture and the interstitial space between the lenslets does not act as a lens. This insertion loss is sometimes referred to as a "fill-factor" power loss, and robs some of the output power of the amplifier array. The power lost in the lenslet array results in heating. It may therefore be necessary to cool the lenslet array. In addition, the lenslet array imprints the far-field pattern of the combined output beam with the Fourier transform of the lenslet array. This results in a loss of beam quality.

A diffractive optical element (DOE) may also be used to combine the beamlets from several fiber amplifiers into one output beam. A DOE is a special type of grating having a grating surface shape (i.e., grooves) constructed according to a particularly designed grating function. A DOE differs from a conventional grating in that the DOE grating is coarser (i.e., the spatial frequency of the grooves of the DOE is much lower), and the shape of the grooves in the DOE surface is important. The product of the grating groove frequency and the light wavelength of the beamlets to be combined defines a characteristic angle, or "eigenangle" measured with respect to the grating normal. Each beamlet to be combined by the DOE must impinge on the grating precisely at a multiple of the characteristic angle if the single combined beam is to have good beam quality and if no exiting satellite beamlets at other than normal incidence to the DOE are to be created. Moreover, the optical phase of each beamlet, measured relative to a central beamlet impinging normal to the DOE surface must either be zero or pi radians according to a certain recipe, in order that no exiting satellite beamlets are to be produced and that the central emerging beam have good beam quality. Deviation from this condition is termed "piston error".

It is preferable that all of the energy exiting the DOE beam combiner be concentrated into a single beam or lobe. Two factors controlling whether this occurs are: (1) phase or "piston" error, defined above, and (2) "tilt" error, whereby one or more beamlets are incident on the DOE at angles which deviate from the aforementioned eigenangles, the values of which are determined by the grating function and the wavelength of the light being combined.

If either piston error or tilt error are present, unwanted secondary beamlets or lobes appear at the exit of the DOE. The beamlets are oriented along eigenangles or exit "orders", again determined by the grating function and the wavelength of the light being combined as described above. This is undesirable because the secondary beamlet generation reduces power and beam quality in the central lobe. In addition, if enough energy is present in the secondary beamlets, the stray beamlets may heat or damage objects or equipment.

Thus, the need exists for a laser system having a plurality of fiber laser amplifiers, each producing an intermediate beamlet, and a diffractive optical element that combines the intermediate beamlets to form an output beam, which laser system substantially minimizes piston error and tilt error with respect to the beamlets incident on the diffractive optical element.

SUMMARY

An improved high-power laser system includes a laser master oscillator, a plurality of fiber laser amplifiers producing intermediate output beamlets, a diffractive optical element for combining the intermediate beamlets into a combined output beam, and one or more error controllers for minimizing errors related to beam combination that may degrade the quality of the combined output beam. A diffractive optical element (DOE) is a special type of coarse grating having a specifically designed grating profile or shape, which is capable of combining the plurality of intermediate beamlets into a single combined output beam, provided that, inter alia: (1) the intermediate beamlets are incident on the DOE face at prescribed angles ("eigenangles") determined by physical characteristics of the grating and the wavelength of the beams being combined; and (2) the intermediate beamlets arrive at the DOE face in phase, or 180 degrees out of phase, according to a certain recipe. Tilt error is failure of condition (1). Piston error is failure of condition (2). Either error causes the emission from the DOC of undesired secondary beamlets which rob power from and reduce the quality of the desired primary combined output beam.

A piston error controller provides for each intermediate beamlet a unique dithering signal used to phase modulate the beamlet before combination. The phase modulation tags each beamlet (other than a defined reference beamlet) with the corresponding dither signal, such that after combination, contributions from such beamlet can be distinguished from those of other beamlets. A small sample of the output beam and any satellite beams is directed onto an optical detector array through an optical system that divides the signal into two parts, causes the optical field to be reversed left-to right and top-to-bottom on one of the arms by the action of a lens pair, and then interferes this modified signal with that in the other arm. An optical detector array senses the interfered result. Satellite beamlets appear as optical sidebands on either side of the central lobe. The phase dither imposed on each incident beamlet shows up after optical detection as a composite amplitude-modulated electrical signal. This electrical signal is then divided between N synchronous detectors (one for each non-central beamlet)—each synchronous detector operating at its unique modulation frequency—and the result applied to a companion integrator. If a particular-tagged beamlet has no piston error, then only the second harmonic of the dither frequency will appear after synchronous detection which averages out in the integrator. On the other hand, if a particular-tagged beamlet has a piston error, there will be a component of the fundamental dither frequency upon synchronous detection that creates an error signal after integration that has a sign and magnitude of the phase error. This control signal is mixed with the low amplitude dither signal to both shift the phase of the corresponding beamlet as well as providing a sensing signal, thus correcting the piston error.

A tilt error controller provides for each non-reference beamlet a tagging signal with which the beamlet is amplitude-modulated prior to combining. The tagging signal allows the contribution of each beamlet to tilt error artifact in the combined output signal to be distinguished from that of other beamlets. The tilt error controller obtains a sample of the combined output beam, and applies an interferometer technique to produce an optical signal proportional to tilt error. The optical signal is captured by a sensor, and for each non-reference beamlet, a corresponding decoder determines the amount of tilt error artifact contributed by such beamlet. The result is a per-beamlet signal proportional to tilt error. For each beamlet, an integrator generates an error control signal which is supplied to a beam steerer to correct the tilt error. The tagging signal may be produced by associating with each beamlet one or more unique code words or vectors from a Hadamard dictionary, replacing code vector elements of value 0 with the value −1, and selecting in turn individual elements of such code vector to control the modulator on a periodic basis. As is known in the art, a Hadamard code vector is orthogonal to all other non-identical Hadamard code vectors. As modified above, the sum of the elements in a Hadamard code vector is zero, and any two such vectors are orthonormal after normalization. These properties allow a signal encoded with a Hadamard code vector to be distinguishably decoded in the presence of other such signals.

The piston error control system and tilt error control system advantageously minimize the production of secondary beamlets exiting the DOE beam combiner, thereby maximizing the energy in the primary combined output beam and improving beam quality. Each error control system is relatively resistant to crosstalk among beamlets, but due to the nature of the controllers as first-order servo-loops, the error will eventually converge to zero despite the crosstalk, albeit perhaps at a slower rate.

DESCRIPTION OF THE DRAWINGS

Features of example implementations of the invention will become apparent from the description, the claims, and the accompanying drawings in which:

DETAILED DESCRIPTION

Figure 1:
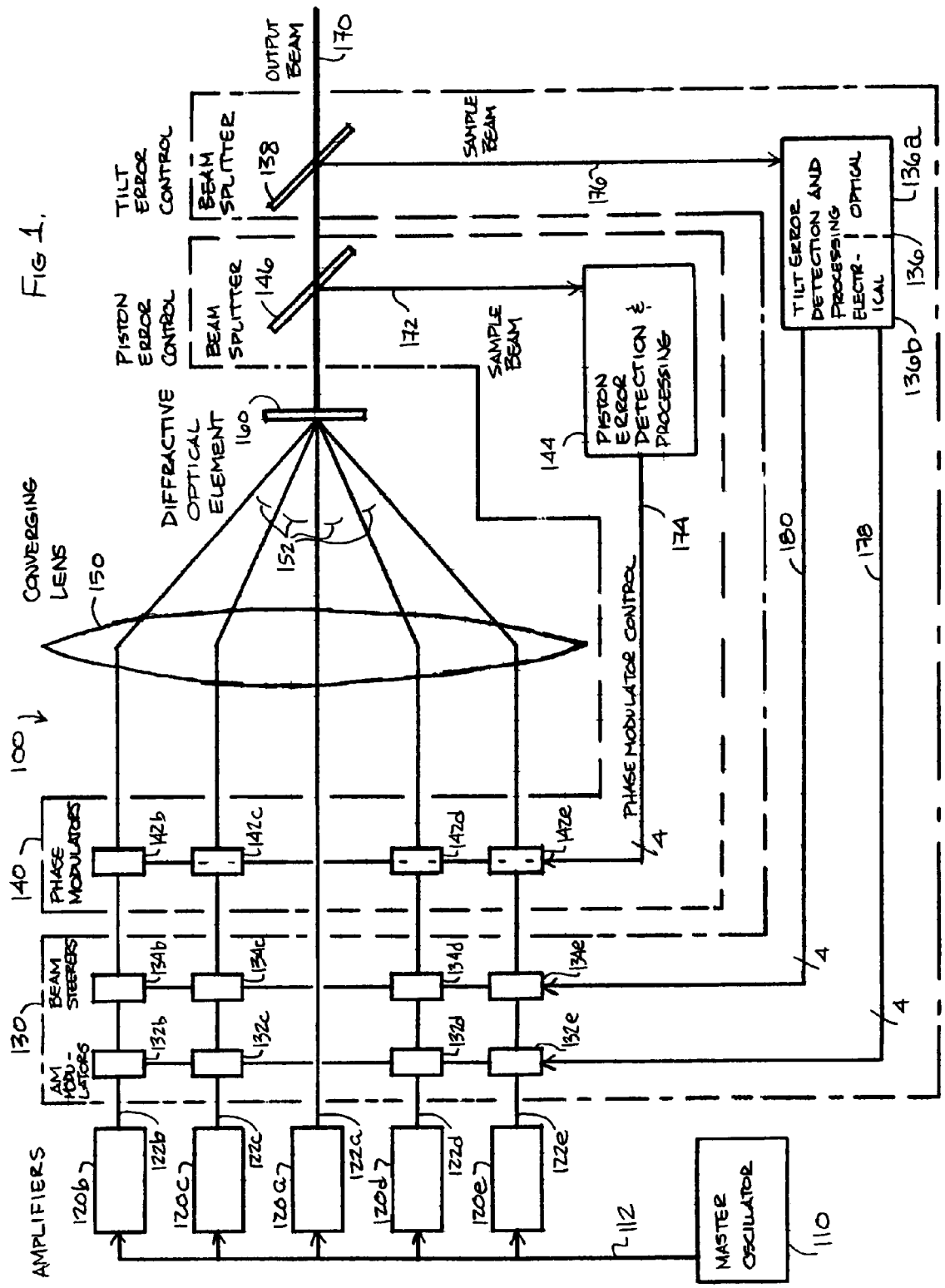
FIG. 1 is a block diagram of an example embodiment of a laser system 100 constructed according to an aspect of the present invention, in which a plurality of fiber laser amplifiers are used to amplify the beam from a master oscillator laser, and the outputs of the fiber laser amplifiers are combined using a diffractive optical element.

FIG. 1 is a block diagram of an example embodiment of a laser system 100 constructed according to an aspect of the present invention, in which a plurality of fiber laser amplifiers are used to amplify the beam from a master oscillator laser, and the outputs of the fiber laser amplifiers are combined using a diffractive optical element. The laser apparatus, control systems, and associated methods described herein are depicted in the application environment of a laser system employing multiple fiber laser amplifiers and a diffractive optical element beam combiner, by way of example but not limitation, to show how challenges encountered in combining multiple beams may be overcome. However, one of skill in the art will appreciate that the control systems could also be advantageously applied to lasers using other beam combination technology, and more generally to other laser types, in environments not limited to fiber lasers, without modification or with modifications within the ken of a person of skill in the art, consistent with the spirit of the invention.

The present application relates to lasers and control systems therefor, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the laser and control system arts, various signal leads, busses, data paths, data structures, channels, buffers, message-passing interfaces, free-space optical paths, fiber optical paths, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

As best seen in FIG. 1, the laser system 100 preferably includes a master oscillator laser 110, a plurality of fiber amplifiers 122a-122e, a tilt error control system 130, a piston error control system 140, a converging lens 150, and a diffractive optical element 160, optically coupled in sequence, to produce a combined output beam 170.

The master oscillator laser 110 may be any suitable laser adapted to provide an output beam which has a desired wavelength for the application and which is compatible with fiber amplifiers 120a-120e. Master oscillator laser 110 preferably is relatively stable and has a narrow bandwidth output spectrum within the amplification passband or gain bandwidth of the fiber amplifiers 120a-120e. By way of example but not limitation, master oscillator laser 110 may be a solid state Neodymium-doped Yttrium-Aluminum-Garnet (Nd:YAG) laser of conventional design operating at a wavelength of 1060 nm. Such lasers are available from commercial sources. Other types of laser may be used as master oscillator 110. The wavelength selected for master oscillator laser 110 and fiber amplifiers 120a-120e controls certain physical parameters of other portions of the laser system 100, as discussed further in greater detail. However, if those parameters are taken into account, the general structure of the laser system 100 described herein is suitable for use with a wide range of wavelengths, corresponding to a range including at least the far infrared through the ultraviolet.

The master oscillator laser 110 is coupled to fiber amplifiers 120a-120e via master oscillator distribution path 112, which may be any appropriate optical path, including free space optics. One or more beam-splitters (not shown) may be provided to divide the master oscillator output beam for use by the several fiber amplifiers. The effective optical path length of master oscillator distribution path 112 to each of the fiber amplifiers 120a-120e is preferably nearly identical (or at least the remainders after integral numbers of whole wavelengths are subtracted are preferably identical) to minimize the phase error of the signal supplied at the input of each amplifier.

Amplifiers 120a-120e are preferably any suitable optically-pumped fiber laser amplifiers, selected for compatibility with the output signal from the master oscillator laser 110, and for a desired power output. Amplifiers of this type are available from commercial sources. Amplifiers of this type are generally designed for a specific wavelength and have a gain bandwidth of a small fraction of a wavelength. By way of example, but not limitation, laser system 100 as described herein has five fiber amplifiers 120a-120e. The number of amplifiers required depends on several factors, including the output power desired and the design of the diffractive optical element (DOE) 160. The DOE 160 is generally designed to combine a specific, odd number of intermediate input beamlets arranged in a specific repetitive one- or two-dimensional pattern.

For a DOE having linear grooves, the input beamlets generally must be incident on the grating in a fan-like radial pattern within a plane normal to the major surface of the DOE and perpendicular to the grooves, wherein adjacent beamlets are radially displaced from one another by a consistent angular increment which is a function of the grating spatial frequency and the wavelength. In general, this means that the fiber amplifiers 120a-120e are arranged in a one-dimensional array. DOEs having a crossed groove pattern could also be used, possibly requiring a different arrangement of fiber amplifiers 120a-120e.

Each of fiber amplifiers 120a-120e produces a respective intermediate output beamlet 122a-122e, which may be any suitable optical path, including without limitation a free-space optical path. The output beamlets are subject to a several errors which, uncorrected, cause the production of secondary outlet beamlets from the DOE 160 or otherwise reduce the quality of the combined output beam 170. "Piston error" is, in essence, a phase displacement of an amplifier's intermediate output beamlet with respect to others. Piston error may arise from mechanical differences between amplifiers, including but not limited to variations in fiber length and other dimensional parameters, anomalies in fiber or coupler construction, and thermal differences. Although it is preferable to have zero piston error, in general, piston errors of less than a milliradian will provide acceptable performance of laser system 100. "Tilt error" is an error in angular alignment of an intermediate beamlet as it strikes the face of the DOE 160. "Tilt error" typically arises from imperfection in the orientation of an amplifier with respect to the DOE 160 or the converging lens 150. Although it is preferable to have zero tilt error, in general, tilt errors of less than one percent of the product of wavelength and the DOE spatial frequency will provide acceptable performance of the laser system 100.

In order to correct these errors, laser system 100 preferably includes a tilt error control system 130 and a piston error control system 140 which modifies one or more of the fiber amplifier output intermediate beamlets 122 to minimize these types of errors. Although all beamlets may be so modified, it may reduce cost and system complexity to assign one beamlet as a "reference" beamlet, which will not be modified by the error control systems, and then modify the remaining beamlets to minimize error with respect to the assigned reference beamlet. As best seen in FIG. 1, the intermediate beamlet 122a from amplifier 120a, which is axially coincident with the combined output beam 170, the central axis of the DOE 160, and the central axis of converging lens 150, is selected as the reference beamlet. It is not required that the beamlet selected to be the unmodified reference beamlet for one of error control systems 130, 140 necessarily be assigned as the reference beamlet for the other.

The structure and operation of the tilt error control system 130 and piston error control system 140 are described further in greater detail. At this point, however, it is important to note that each of the fiber amplifier output intermediate beamlets 122 other than that selected as the reference beamlet may be modified for error minimization purposes. AM modulators 132b-132e are preferably interposed in the paths of intermediate beamlets 122b-122e to impose a beam tagging signal needed by tilt error control system 130 measure and distinguish the tilt error associated with each intermediate beamlet. Beam steerers 134b-134e are preferably interposed in the paths of intermediate beamlets 122b-122e to allow tilt error control system 130 to adjust the alignment of each intermediate beamlet. Phase modulators 142b-142e are preferably interposed in the paths of intermediate beamlets 122b-122e to allow piston error control system 140 measure and distinguish the piston error associated with each intermediate beamlet, and to adjust the phase of each intermediate beamlet to minimize the piston error. AM modulators 132b-132d and phase modulators 142b-142d could instead be interposed in the signal paths 112 between the master oscillator and the fiber amplifiers, after the point where the master oscillator signal is divided into multiple paths for distribution to the fiber amplifiers, but it is believed that the best results are obtained by having these components in the paths between the amplifiers 122b-122e and the converging lens 150.

The converging lens 150 causes the fiber amplifier output intermediate beamlets 122b-122e to converge on a focal location on the face of DOE 160. Any suitable lens which is compatible with the wavelength of the amplifier output beams may be used. A typical lens has appropriate coatings to minimize internal reflection. The lens 150 may be constructed of glass or of other appropriate optical materials. The focal ratio of the lens may be approximately 1:3.5, but other lenses could also be used. The focal length of the lens, and its distance from the DOE 160, are selected to cause the fiber amplifier output intermediate beamlets 122a-122e to strike the DOE 160 at multiples of a characteristic incident angle (eigenangle) determined by parameters of the DOE and the wavelength. The design of such lens parameters is well known in the art.

Diffractive optical element (DOE) 160 combines the fiber amplifier output intermediate beamlets 122b-122e into a combined output beam 170. DOE 160 is a special type of grating having a grating surface shape (i.e., grooves) constructed according to a particularly designed grating function. A DOE differs from a conventional grating in that the DOE grating is coarser (i.e., the spatial frequency of the grooves of the DOE is much lower), and the shape of the grooves in the DOE surface is important. The product of grating line frequency (lines/cm) multiplied by the light wavelength (cm) defines a characteristic angle or 'eigenangle,' expressed in radians. Beamlets must be incident on the DOE at angles 152 equal to plus or minus the eigenangle (as measured from the grating normal), or in plus or minus simple integer multiples of the eigenangle in order that the beamlets be combined into a single output beam exiting from the opposite side of the DOE.

Figures 2, 3:
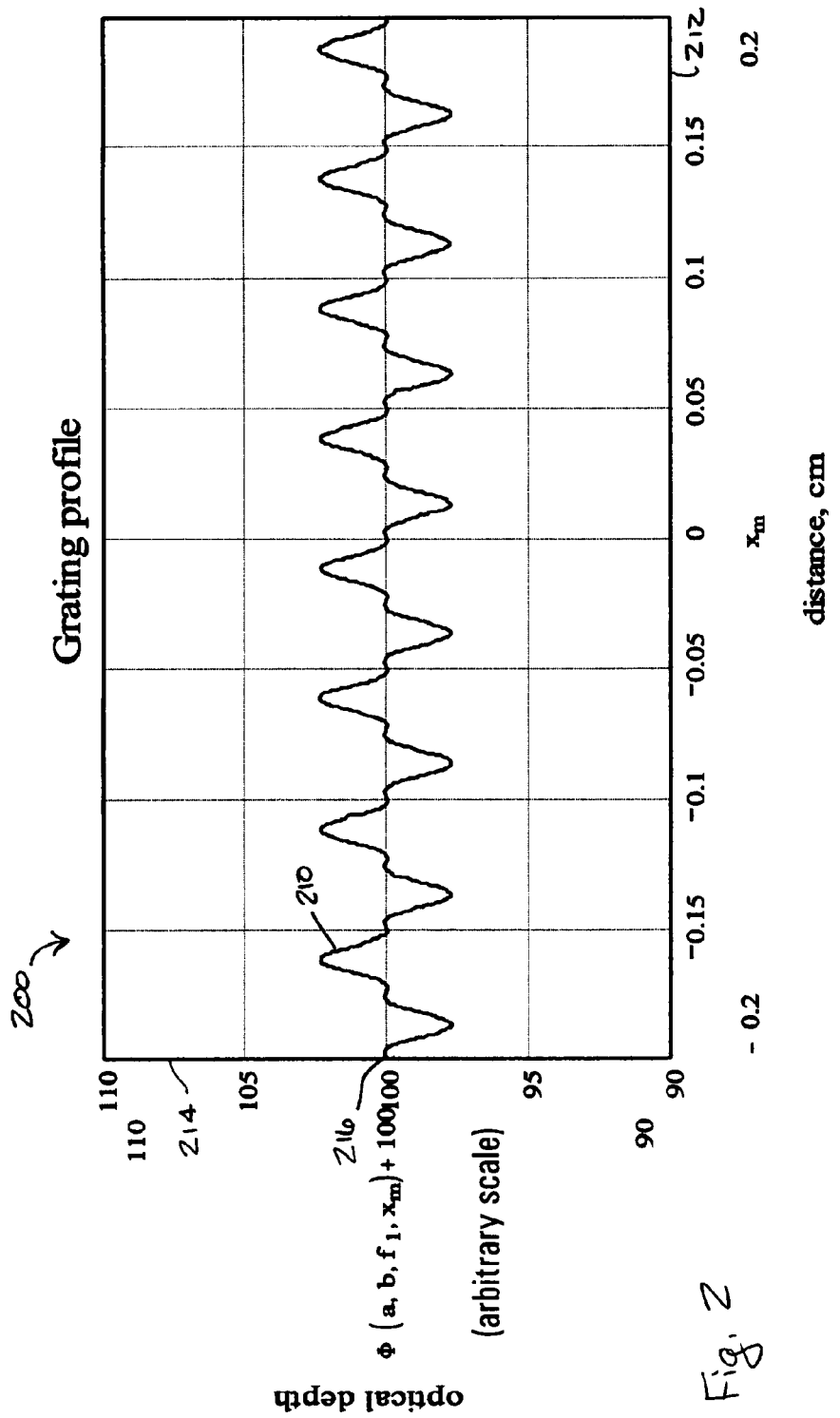
FIG. 2 is a graph 200 depicting a grating profile 210 for an example embodiment of a diffractive optical element (DOE) 150 which may be used in the laser system 100 of FIG. 1.
FIG. 3 depicts two equations which define physical characteristics of the DOE 150 of FIGS. 1-2.

FIG. 2 is a graph 200 depicting a grating profile 210 for an example embodiment of a DOE 150 which may be used in laser system 100. The grating profile shown in FIG. 2 is, in essence, a cross section view through the DOE 150 along an axis perpendicular to the grooves of the DOE. The aforementioned perpendicular axis is represented as the abscissa or X-axis 212 of graph 200. The grating profile 216 is depicted as the surface boundary position or relative optical depth, proportional to the substrate index of refraction. The scale is chosen to reveal the groove profile, but is otherwise arbitrary, as measured by the ordinate or Y-axis 214.

FIG. 3 depicts two equations which define physical characteristics of the DOE. The grating profile 210 is defined by a grating profile function 312. Function 310 defines a grating transmission function. The far-field pattern of the DOE is equal to the Fourier transform of the sum of the incident electric fields, each one multiplied by the grating transmission function. As best seen in FIG. 2, the fundamental line spacing, or spatial frequency of the DOE is F0=20 lines per cm. This is very small compared to that of conventional gratings (typically 10000-70000 lines per cm.). The grating function 312 has a first term varying at a first frequency (F0), and a second term varying at a frequency F1=3 F0 with coefficients indicating the ruling optical depth at the operating optical wavelength. The particular shape of the grating profile is important to the beam combining function; deviations will degrade or completely eliminate the ability of the DOE to combine the intermediate beamlets. The coefficients in the grating profile have been selected to minimize stray power in secondary exit lobes.

The separation interval 152 between adjacent eigenangles is defined by the product of the wavelength of the beams being combined and the spatial frequency of the DOE. For the example DOE 150 defined by DOE grating profile function 312, operating at a wavelength of 1060 nm, the interval between adjacent eigenangles is 2.128 mrad. Although the grating profile function 312 of FIGS. 2-3 is suitable for a range of wavelengths, if significantly shorter wavelengths are used while holding the DOE spatial frequency constant will result in small eigenangle separation intervals, which may make it difficult or impossible to properly arrange the intermediate beamlets to strike the DOE 150 at the correct incident angles. Thus, it may be necessary to increase the spatial frequency of the grating to accommodate intermediate beamlets of shorter wavelengths. The design of suitable diffractive optical elements has been well described in technical literature, and suitable DOEs are available from commercial sources. It is believed that current technology allows the construction of DOEs having a desired grating profile shape with a spatial frequency as high as 10000 rules per cm, and therefore the spatial frequency of available DOEs is unlikely in practice to be a factor limiting the practical application of this beam combination apparatus for shorter wavelengths.

DOE 160 produces a combined output beam 170 that exits the opposite face of the DOE 160 from which the beamlets entered. The combined output beam 170 may contain artifacts of uncorrected tilt error and uncorrected piston error. Accordingly, samples of the combined output beam 170 are obtained for use by piston error control system 140 and the tilt error control system 130 as further described below.

In accord with a further aspect of the present invention, the piston error control system 140 includes a sampling beam splitter 146, a piston error detection and processing unit 144, and a plurality of phase modulators 142b-142e interposed in the fiber amplifier output intermediate beamlets 122b-122e (other than the selected reference beamlet 122a). In brief, the piston error detection and processing unit 144 receives the sample of combined output beam 170 from piston error sampling beam splitter 146 over path 172. The piston error detection and processing unit 144 supplies phase error modulator control signals via bus 174 to the respective phase modulators 142b-142e. A separate phase error modulator control signal is provided for each of phase modulators 142b-142e. Each of the phase error modulator control signals 174 includes a dither component unique to the respective modulator and a piston error control component, also unique to the modulator. The unique dither component allows the piston error detection and processing unit 144 to distinguish the piston error associated with each corresponding fiber amplifier output intermediate beamlet 122 from those of the other beamlets and to generate a piston error control component to be fed to the associated phase modulator for use in correcting the piston error.

Figure 4:
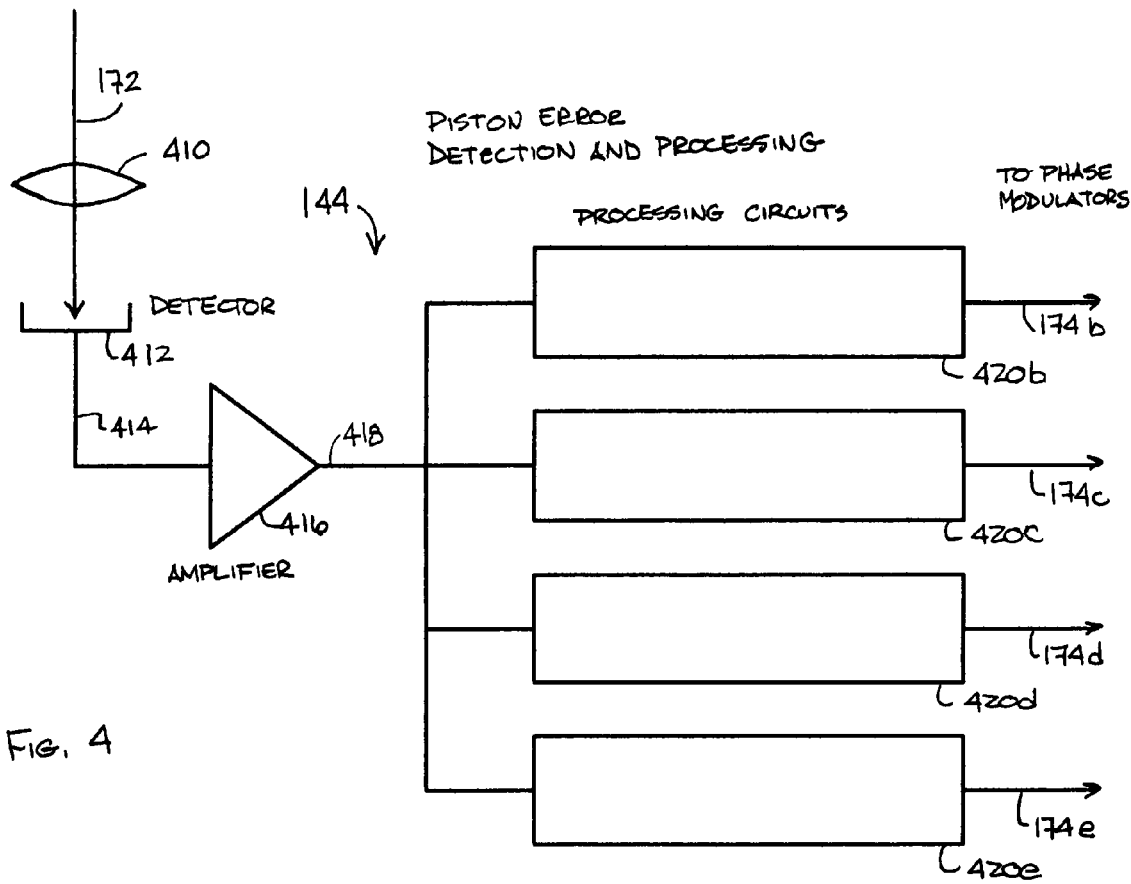
FIG. 4 is a block diagram of an example piston error detection and processing unit 144 for use in conjunction with the laser system 100 of FIG. 1.

FIG. 4 is a block diagram of the piston error detection and processing unit 144. Piston error detection and processing unit 144 includes a lens 410, a detector 412, an amplifier 416, and a plurality of piston error processing circuits 420b-420e, each corresponding to one of the fiber amplifier output intermediate beamlets 122b-122e (FIG. 1) (excluding the central beamlet). Piston error sample beam 172 is a sample of combined output beam 170 provided by piston error sampling beam splitter 146 (FIG. 1). Any suitable beam splitter may be used as beam splitter 146, including without limitation a partially silvered mirror. Only a small fraction of the combined output beam 170 need be collected as a sample. Lens 410 focuses the piston error sample beam 172 on piston error detector 412. Piston error detector 412 may be implemented by any suitable detector which produces an electrical signal proportional to the amplitude of the piston error sample beam 172 incident on the detector, including without limitation a photodiode, phototransistor, photocell, or array thereof. Detector 412 produces an output signal 414 which is supplied to amplifier 416. Amplifier 416 provides an amplified sample signal 418 which is distributed to each of the piston error processing circuits 420b-420e.

Each processing circuit produces a corresponding phase error modulator control signals on bus 174. Each control signal includes a phase dither component unique to that control circuit, and therefore also unique to the corresponding fiber amplifier output intermediate beamlet. Each control signal also includes a piston error correction component. Each unique dither component "tags" the corresponding beamlet and allows the piston error associated with that beamlet, and represented in the piston error sample beam 172, to be distinguished by the processing circuit from the piston errors of other beamlets. The control signal is supplied to the corresponding phase modulator to adjust the phase and thereby correct the piston error. Any suitable optical phase modulator may be used to implement phase modulators 142b-142e. By way of example but not limitation, each of phase modulators 142b-142e may be implemented using a Pockel's Cell phase modulator. The phase modulator receives an electrical signal; internally, the phase modulator has a refractive index that varies with an applied electric field. The phase modulator thus provides a variable phase delay which can be used to correct piston error. The magnitude of dither phase modulation is preferably limited to a small value, such as a few degrees of phase, in order to limit degradation of the far-field beam quality. Although four piston error processing circuits 420b-420e are shown, any number of processing circuits could be used as needed to accommodate the number of beamlets to be corrected (excluding the designated reference beamlet.

Figure 5:
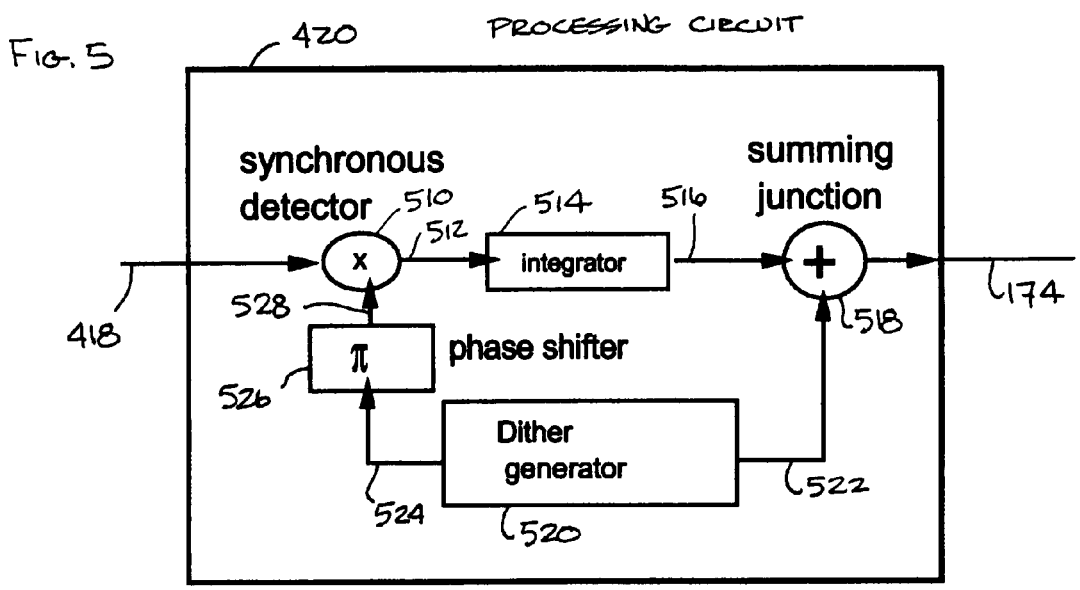
FIG. 5 is a block diagram of an example embodiment of a piston error processing circuit 420 which may be used as a portion of the piston error detection and processing unit 144 of FIGS. 1 and 4.

FIG. 5 is a block diagram of an example embodiment of a piston error processing circuit 420 which may be used as the processing circuit 420b-420e of FIG. 4. Thus, the processing circuit 420 of FIG. 5 may be replicated as many times as necessary to provide the processing required by piston error detection and processing unit 144 for each of the non-reference intermediate beamlets 122b-122e. As best seen in FIG. 5, piston error processing circuit 420 preferably includes an optical detector followed by a synchronous detector 510, an integrator 514, a summing junction 518, a dither generator 520, and a phase shifter 526. In operation, the optically detected and amplified piston error sample signal 418 is provided to synchronous detector 510. Dither generator 520 furnishes a dither signal to the phase modulators via path 522, summing junction 518, and phase modulator control signal bus 174. The signal is also furnished via path 524 to a phase shifter 526, which shifts its phase by pi radians. The result of the phase shift is provided to the synchronous detector 510 via path 528.

The dither signal generated by each processing circuit 420 is unique and non-harmonically related to the dither signals generated by the other processing circuits. As a result, the dither signal uniquely identifies any piston error component or artifact in the combined output beam due to the corresponding fiber amplifier. The piston error synchronous detector 510 extracts the error signal arising from the piston error associated with the dither-frequency tagged intermediate beamlet. The output signal 512 from the synchronous detector 510 is furnished to the integrator. The integrator 514 accumulates the phase error extracted by the synchronous detector. When the phase error is fully compensated, only the second and higher harmonics of the dither frequency is present, and hence the integrated signal registers a null. The output of integrator 514 is furnished to the summing junction 518 via path 516. The phase modulators 142b-142e are driven such that the rate of phase change is proportional to the magnitude of the integrator voltage and the phase change direction is consistent with the sign of the integrator voltage.

The synchronous detector 510, integrator 514, summing junction 518, dither generator, phase shifter 526, and synchronous detector 510 may be implemented using conventional electronic components as is well known in the art. Suitable components are readily available from commercial sources.

The piston error control system 140 thus forms a dither servo-loop that drives piston error to zero. The capture range of this circuit is ±pi/2. If a piston error occurs in this range, the piston error control system 140 will drive it to zero. In addition, there is no "dead band" near zero error, and therefore, proportional control extends throughout the entire capture range. A small amount of crosstalk may be present due to imperfection in the synchronous detection. However, as the error in one circuit is reduced, the residual error affecting other circuits is also reduced. Thus, eventually all circuits will converge to zero piston error, although such convergence may require more time than if no crosstalk were present.

Figure 6:
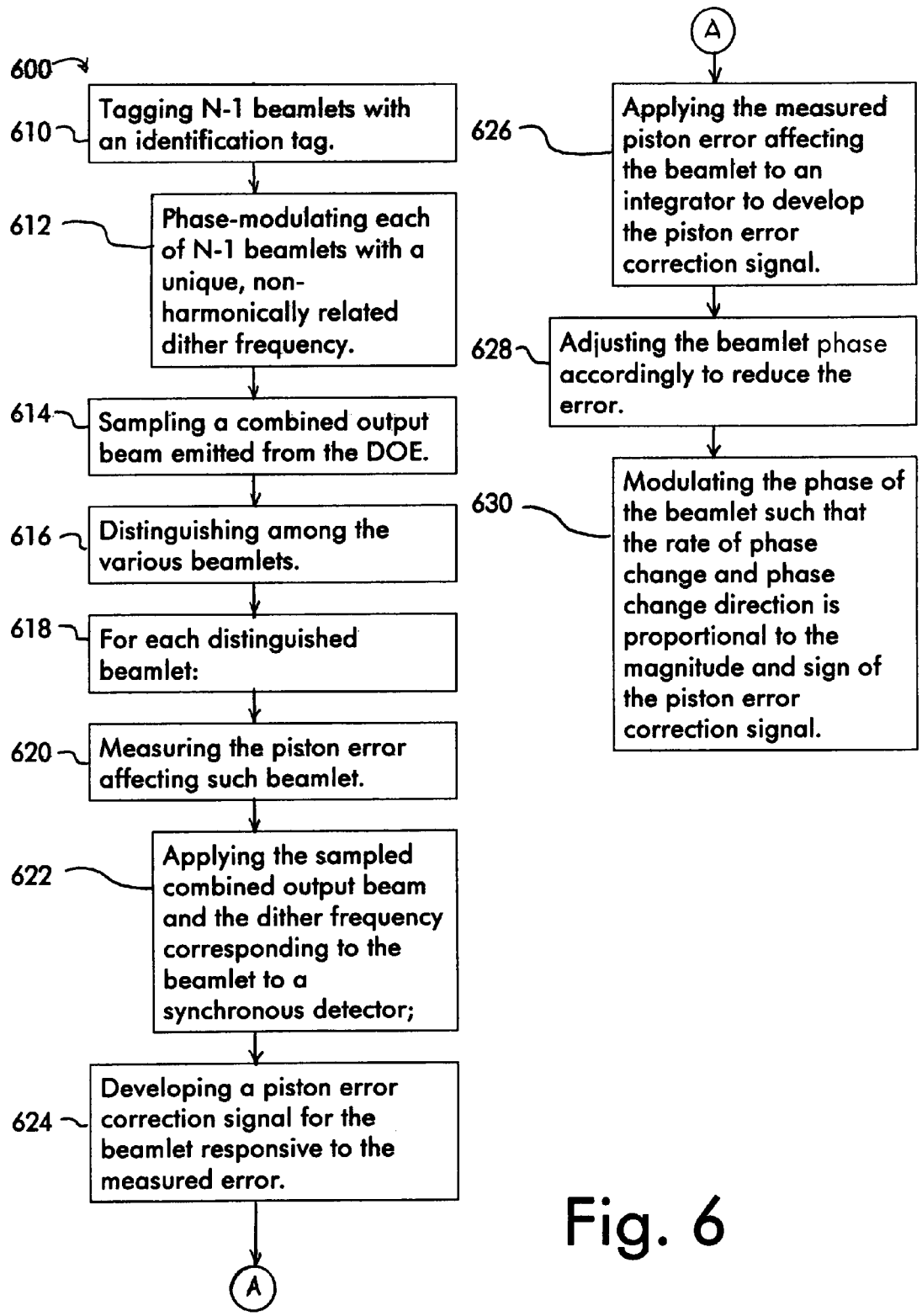
FIG. 6 is a flow diagram showing a method 600 for use in conjunction with the laser system 100 of FIGS. 1, 4, and 5 in controlling piston error.

In accord with a further aspect of the present invention, FIG. 6 is a flow diagram of a method 600 for use with the laser system 100 for use in controlling piston error. One of skill in the art will appreciate that the method may be used with the apparatus of FIGS. 1 and 4-5, but could also be used with other apparatus and with other beamlet tagging techniques without departing from the spirit of the invention. Accordingly, some primary steps are presented in a generalized from that does not rely on the particular apparatus of FIGS. 1 and 4-5. It is noted in the description of certain steps and substeps that such steps may be performed by specific elements of the apparatus of FIGS. 1 and 4-5. The association of steps and apparatus is done by way of example but not limitation, and it is to be understood that these steps could be performed by other apparatus. Moreover, optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

In step 610, the system tags each of at least N-1 intermediate amplifier output beamlets with an identification tag, code, or signal or the like, where N is the total number of beamlets. If one beamlet is assigned as a reference beamlet, then that beamlet may be defined to have zero piston error, and need not be tagged.

In an optional substep 612, the tagging of step 610 is implemented by phase-modulating each of the N-1 beamlets with a unique, non-harmonically related dither frequency. Steps 610 and 612 may be performed, for example, by dither generator 520, summing junction 158, and phase modulators 142b-142e of FIGS. 1 and 5.

In step 614, the combined output beam emitted from the DOE is sampled. Step 614 may be performed, for example, by piston error sampling beam splitter 146, lens 410, piston error detector 412, and detector output signal amplifier 416 of FIGS. 1 and 4.

In step 616, the system distinguishes among the various beamlets. In step 618, beamlets are selected or isolated for further processing. Subsequent steps are performed with respect to each sampled beamlet, and may be performed for all beamlets in parallel, or may be performed for each beamlet in seriatim.

In step 620, the system measures the piston error affecting a particular beamlet, distinguishing the piston error of the corresponding beamlet from that of other beamlets using the identification tag of step 610. The term "measure" as used in connection with steps 620, 622, and 624 is not intended to refer to a precise numerical value having significance outside of the piston error control system 140. Instead, the term "measure" as used here refers to developing a signal representative of the error, and containing sufficient information for the piston error control system 140 to effectively adjust the phase error. Although the measuring step, as implemented by the apparatus of FIGS. 1, 4, and 5 produces a signal proportional to and having the sign of the error, other implementations could use other types of signals, including non-proportional or discrete-valued signals. Although such other types of signals may not provide the performance of a proportional signal, the control achieved by such other types of signals may nonetheless minimize the piston error sufficiently for some applications.

In substep 622, the measuring of step 620 is implemented by applying the sampled combined output beam and a dither frequency corresponding to such beamlet, but harmonically unrelated to dither frequencies associated with other beamlets, to a synchronous detector. The functions of steps 620 and 622 may be performed, for example, by dither generator 520 and phase shifter 526, and the sampling components 146, 410, 412, and 416. Step 622 may be considered optional in that although substep 622 refers to a specific technological approach for measuring piston error affecting a particular beamlet, other technologies, apparatus, and associated substeps could also be used.

In step 624, the system develops a piston error correction signal for the beamlet responsive to the measured error.

In substep 626, the error correction signal development of step 624 may be implemented by applying the measured piston error affecting the beamlet to an integrator to develop the piston error correction signal. The function of step 626 may be performed, for example, by integrator 514. Substep 626 may be considered optional in that although substep 626 refers to a specific technological approach for developing a piston error correction signal for a particular beamlet, other technologies, apparatus, and associated substeps could also be used.

In step 628, the system adjusts the beamlet in accord with the piston error correction signal of step 624 to reduce the piston error.

In substep 632, the adjusting of step 630 may be implemented by modulating the phase of the beamlet such that the rate of phase change and phase change direction is proportional to the magnitude and sign of the piston error correction signal. The function of steps 628 and 630 may be performed, for example, by phase modulators 142b-142e. Substep 630 may be considered optional in that although substep 630 refers to a specific technological approach for adjusting a particular beamlet to the reduce piston error contributed thereby, other technologies, apparatus, and associated substeps could also be used.

The steps or operations described herein are just for example. There may be many variations to these steps or operations without departing from the spirit of the invention. For instance, the steps may be performed in a differing order, or steps may be added, deleted, or modified.

According to a further aspect of the invention, the laser system 100 preferably also comprises a tilt error control system 130 (FIG. 1). Tilt error arises from angular misalignment of the fiber amplifier output intermediate beamlets 122 with respect to the face of DOE 160. Each beamlet must approach the face of DOE 160 at one of several allowable entry angles. One allowable entry angle is exactly normal to the face of DOE 160, and all other allowable entry angles are eigenangles or characteristic angles displaced from normal by an angular interval defined by the DOE grating function and the wavelength of light being combined. Due to imperfect alignment, each of the fiber amplifier output intermediate beamlets 122 may contribute a tilt error component to the combined output beam 170.

Misalignment of the beamlet assigned to enter the DOE 160 normal to its face may prevent the subsequent alignment of the beamlets assigned to enter at other allowable angles. Accordingly, the central beamlet 122a, which is assigned to enter the DOE 160 normal to the face thereof, is selected to be a reference beamlet for tilt error control purposes. As a step in manufacturing, assembly, or installation of the laser system 100, one or both of the reference beamlet 122a and the DOE 160 are preferably adjusted such that the reference beamlet is aligned as close to normal as possible to the face of DOE 160. The reference beamlet for tilt error control need not be the same beamlet selected as reference for piston error control, although it is convenient that they be the same. Because piston error arises from phase misalignment of fiber amplifier output intermediate beamlets 122 with respect to one another, rather than with another object as in the case of tilt error, any one of the fiber amplifier output intermediate beamlets 122 may be selected to be the reference beamlet for piston error control.

To minimize the total tilt error, in addition to aligning the reference beamlet 122a, it is also necessary to align all of the non-reference beamlets 122b-122e. This task is performed by tilt error control system 130. In further discussion of the tilt error control system 130, the convention previously established herein of referring to the non-reference beamlets and items associated therewith, using reference characters "b-e" is retained. Because the tilt error control system 130 generally operates only on the non-reference beamlets 122b-122e, there is usually no element corresponding to reference character "a".

As best seen in FIG. 1, tilt error control system 130 preferably includes tilt error sampling beam splitter 138, tilt error detection and processing unit 136, AM modulators 132b-132e for each of the non-reference fiber amplifier output intermediate beamlets 122b-122e, and beam steerers 134b-134e for each of the non-reference intermediate beamlets.

The tilt error sampling beam splitter 138 provides a tilt error sample beam 176 to the tilt error detection and processing unit 136. Any suitable beam splitter may be used as beam splitter 138, including without limitation a partially silvered mirror. Only a small fraction of the combined output beam 170 need be diverted as a sample for use by tilt error detection and processing unit 136. For example, five percent of the combined output beam 170 may be diverted by the beam splitter 138, although the appropriate amount may vary depending on the power of the combined output beam 170, the attenuation through the optical paths, and the sensitivity of the detector equipment in tilt error detection and processing unit 136.

The tilt error artifacts present in the combined output beam 170 are the sum of the tilt error artifacts contributed by the respective tilt errors of each of the fiber amplifier output intermediate beamlets 122. In order to measure the tilt error, tilt error detection and processing unit 136 preferably comprises an optical processing part 136a (FIGS. 1, 7) which processes the tilt error sample beam 176 to produce an optical or electrical signal representative of the tilt error. For example, tilt error detection and processing unit 136 may employ interferometry to produce an interference pattern such that the energy present therein is proportional to the tilt error contributions present in the combined output beam 170. Appropriate techniques other than interferometry could also be used. The tilt error optical processing part 136a is described further in greater detail (see FIG. 7 and the description thereof).

The tilt error detection and processing unit 136 preferably further comprises an electrical processing part 136b (FIGS. 1, 8-10), responsive to the combined output beam tilt error measured by the optical processing part 136a, to distinguish the tilt errors contributed by each of the non-reference beamlets 122b-122e and to produce appropriate signals for controlling such errors. Tilt error electrical processing part 136b furnishes AM modulator control signals via bus 178 to each of the AM modulators 132b-132e. The control signals cause the AM modulators to modulate each of the non-reference beamlets 122b-122e with an appropriate unique tagging or identification signal, such that tilt error associated with such beamlet can be measured by tilt error detection and processing unit 136 and distinguished from the tilt error associated with all other beamlets. The generation of the unique tagging or identification signal is described further in greater detail (see FIGS. 8-9 and the description thereof). AM modulators 132b-132e may be implemented using any suitable modulator technology, including but not limited to a Mach-Zehnder interferometer. Such interferometers are available from commercial sources.

Because each of non-reference beamlets 122b-122e is distinguishably tagged or encoded, an appropriate decoder respectively associated with each non-reference beamlet can be used to distinguish the magnitude of tilt error artifact contributed by such beamlet from that contributed by all other beamlets, effectively producing a measure of tilt error for each beamlet. Decoding and measurement of each non-reference beamlet tilt error contribution is described further in greater detail (see FIGS. 8-10 and the description thereof).

For each beamlet, the measured tilt error is supplied to a respective integrator; the integrator value is used to produce a proportional signal to control a respective one of beam steerers 134b-134e. Each of the beam steerers 134b-134e can introduce an angular displacement of the corresponding one of non-reference beamlets 122b-122e and thereby adjust the entry angle of such beamlet with respect to the DOE 160. Thus, tilt error control system 130 forms a first order or Type I servo loop for each non-reference beamlet which drives to zero the tilt error contributed by that beamlet. The terms "first order" and "Type I" refer to a set of servo loop properties well known to persons of skill in the art of control systems. The servo loops referred to herein have the "first order" and "Type I" properties, and these terms are used interchangeably herein.

The beam steerer control signals are furnished to beam steerers 134b-134e via a bus 180. Beam steerers 134b-134e may be implemented using any appropriate beam steering technology, including but not limited to liquid crystal devices, and reflective surfaces positioned by piezo-electric actuators. Various beam steering technologies are well known in the art, and such beam steering devices are available from commercial sources.

Figure 7:
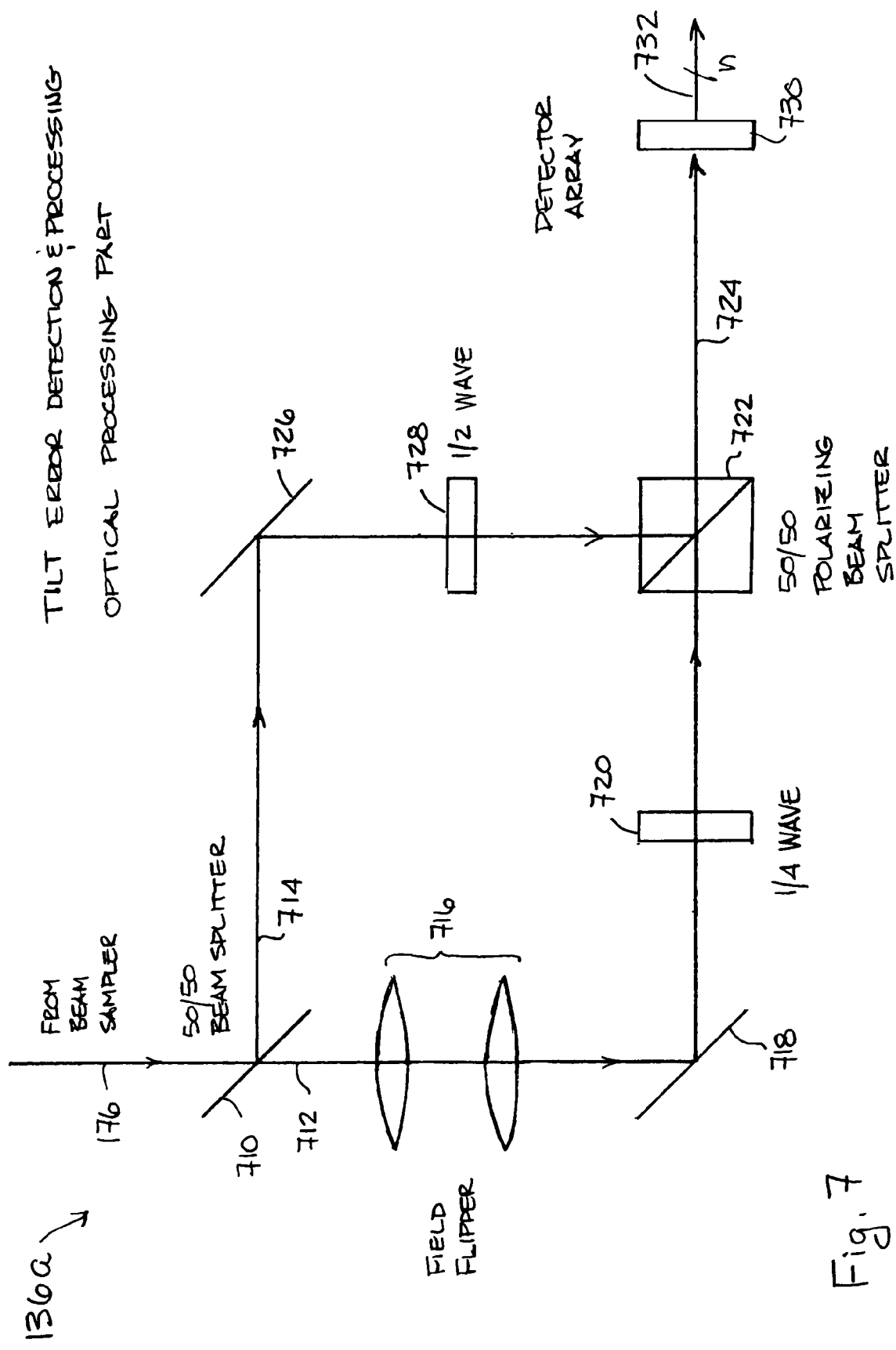
FIG. 7 is a block diagram of an optical processing part 136a of the tilt error detection and processing unit 136 of tilt error control system 130, for use with the laser system 100 of FIG. 1.

FIG. 7 is a block diagram of an optical processing part 136a which serves as an interferometer for the tilt error detection and processing unit 136. As best seen in FIG. 7, the optical processing part 136a receives the tilt error sample beam 176 from the tilt error sampling beam splitter 138, detects the tilt error contributions present therein, and produces signal 732 representative thereof. The tilt error sample beam 176 is passed through a 50/50 beam splitter 710 to produce a first branch field 712 emitted from the non-diverted port of the beam splitter, and second branch field 714 emitted from the diverted port of the beam splitter. The 50/50 beam splitter 710 may be implemented using any appropriate beam splitting technology, including but not limited to a partially silvered mirror. Such beam splitters are commercially available.

The first branch field 712 is passed through an optical field flipper 716, which flips or transposes the field, e.g., left-to-right and top-to-bottom. Field flipper 716 may be implemented, for example, by an aligned pair of suitable lenses, as is known in the art, or by any other suitable technology. The flipped first branch field is reflected by a mirror 718 and then passes through a ¼-wave retardation plate 720. The ¼-wave retardation plate 720 provides a change in polarization from linear to circular. Any suitable ¼-wave retardation plate may be used. Such retardation plates are commercially available. The resulting branch field is then applied to non-diverted port of a 50/50 polarizing beam splitter 722. (As is known in the art, a quarter wave plate changes a linearly polarized light signal into a circularly polarized one. If a second quarter-wave plate is used following the first, a linearly polarized signal is restored but with a polarization at right angles to the original polarization direction. Two quarter wave plates arranged in series are identical in function to a half-wave plate.)

The second branch field 714 is reflected by a mirror 726. The second branch field 714 then passes through a ½-wave retardation plate 728a. The ½-wave retardation plate 728 which rotates the polarization by 90 degrees. The resulting branch field is then applied to the diverted port of 50/50 polarizing beam splitter 722.

The 50/50 polarizing beam splitter 722 combines the first and second branch fields 712, 714 into a recombined interference beam 724, which is applied to the face of a detector array 730. Any suitable polarizing beam splitter may be used; such polarizing beam splitters are commercially available.

The actions of the ¼-wave retardation plate 720 and the polarizing beam splitter 722 on the first branch field 712 is such that it interferes with the second branch field 714 once the two branch fields are combined by the polarizing beam splitter 722. The function of the interferometer of the tilt error optical processing part 136a is to cause the left- and right-hand sides of the optical field to interfere. Tilt error results in satellite beamlets, which appear as optical sidebands on either side of the central lobe. A lack of balance indicates a tilt misalignment in one or more of the fiber amplifier output intermediate beamlets 122 incident on the DOE 160.

If x denotes a displacement distance from the center of the wave, then the interferometer and detector combination detects a signal $F(x)=|U(x)U(-x)|$. When there are no tilt errors, then $F(x)=0$ if x is not zero—that is, at positions displaced from the center of the optically processed beam. If there are tilt errors, then $F(x,t)$ is a signal formed from the sum of the tilt error interference artifact contributions from each misaligned beamlet, according to $|(U_1(x,t)+U_2(x,t) \ldots )(U_1(-x,t)+U_2(-x,t) \ldots )|$. Thus, the signals supplied by the detector array 730 on its output bus 732 are representative of the tilt errors contributed by all of the beamlets combined.

Figure 8:
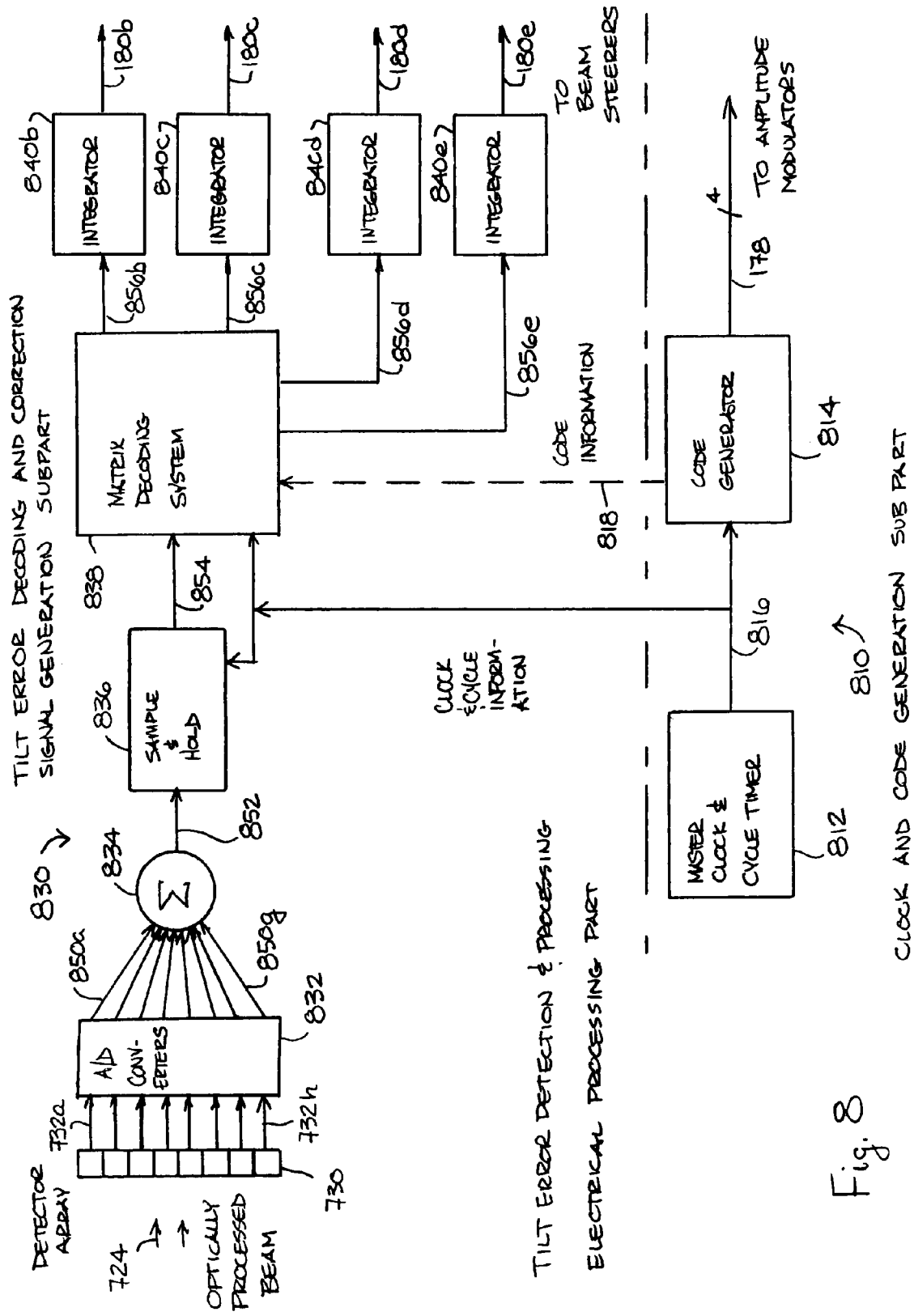
FIG. 8 is a simplified block diagram of an electrical processing part of an electrical processing part 136b of the tilt error detection and processing unit 136 of the tilt error control system 130, for use with the laser system 100 of FIG. 1.
Figure 10:
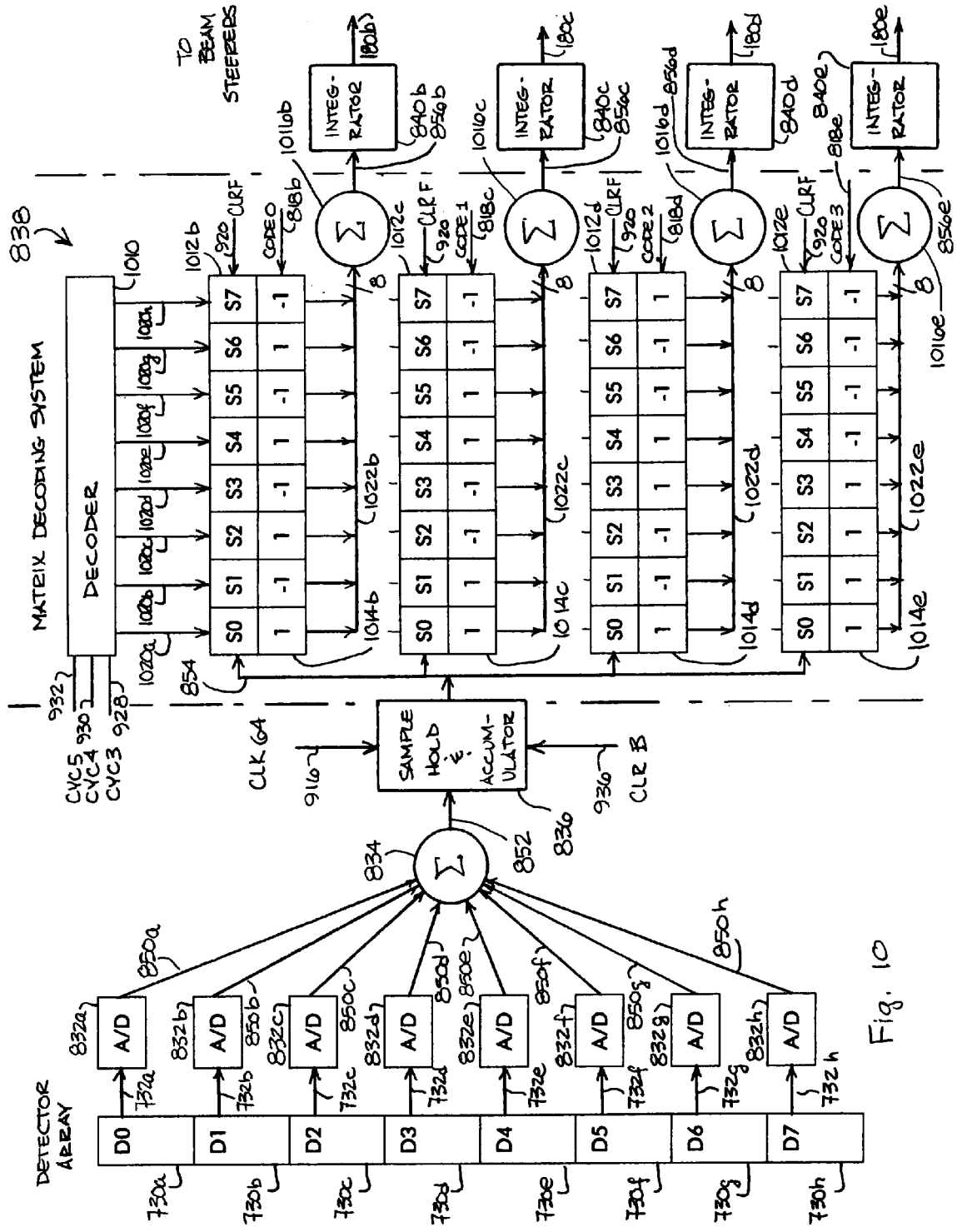
FIG. 10 is a block diagram showing a coding and correction signal generation subpart 830 of an electrical processing part 136b of FIGS. 1 and 8, for use with the tilt error control system 130 of laser system 100 of FIG. 1.

The detector array 730 may be any suitable array of detector elements employing any appropriate detector technology. For example, the detector array 730 may employ a plurality of detector elements 730a-730h (see FIGS. 8 and 10) arranged in a linear pattern, aligned in a plane that contains the central order and any secondary beamlets that exist by virtue of misalignment or piston error. The appropriate inter-element spacing of detector elements 730a-730h for a particular embodiment varies depending on the length of the optical path between the DOE and the detector array. The inter-element spacing is determined the expected spread of satellite beamlets and the distance from the DOE. Assume that any lenses following the DOE form a telescope with unity magnification. For a beamlet separation of 2.128 milliradians, satellite beamlets will be spaced by about 106 microns if the detector plane is 5 cm from the DOE. Hence the detector pitch (element spacing) is about 100 microns. By way of example but not limitation, the detector elements 730a-730h may be implemented using photocells, photodiodes, phototransistors, photovoltaic devices, CCD or CMOS image sensors, or other appropriate detector devices that can produce an electrical signal representative of the intensity of light incident on the elements. In a laboratory embodiment of tilt error detection and processing unit 136a for use with a 1060 nm laser system, an array of silicon-PIN-diode type detector elements was successfully employed. If a laser system 100 producing output at a wavelength substantially different from this 1060 nm example is to be constructed, it may be necessary to select a different detector type which is more appropriate for the wavelength in use. For example, in the intermediate infrared wavelengths, mercury-cadmium-telluride diode arrays would be preferred. One of skill in the art will appreciate how to select a detector technology appropriate for the wavelength in use. Although eight detector elements are shown in FIGS. 8 and 10, the specific number of detector elements used is non-critical. The number of detector elements used may be selected depending on the commercial availability of suitable detector arrays and on the convenience and expense of a like number of downstream elements, such as analog-to-digital converters, for the processing of the detector output signals.

The detector array 730 furnishes output signals via a detector output signal bus 732, discussed further in greater detail in connection with FIGS. 8 and 10. As noted above, the output signals supplied by the detector array 730 are representative of the tilt errors contributed by all of the beamlets combined. In order to correct the tilt misalignment of the individual beamlets, it is necessary to measure their individual tilt errors, which function is performed by tilt error electrical processing part 136b.

FIG. 8 is a simplified block diagram of the electrical processing part 136b. The electrical processing part 136b may be subdivided into a clock and code generation subpart 810, which is shown in greater detail in FIG. 9, and a coding and correction signal generation subpart 830, which is shown in greater detail in FIG. 10. As best seen in FIG. 8, clock and code generation subpart 810 preferably comprises a master clock and cycle timer 812 and a code generator 814.

The master clock and cycle timer 812 provides on bus 816 a set of clock and cycle information signals which are used to control the timing of the remaining elements of electrical processing part 136b. Responsive to clock and cycle information from master clock and cycle timer 812, code generator 814 produces code information for use in impressing on each of the non-reference beamlets 122b-122e a respective tagging or identification signal. The tagging or identification signal enables the tilt error contributed by each non-reference beamlet in the combined output beam 170 to be distinguished from the other beamlets. Code generator 814 produces control signals containing the code information on a bus 178 which is supplied to the AM modulators 132b-132e. Code generator 814 also provides code information on a bus 818 for use by coding and correction signal generation subpart 830 in detecting the tagging or identification signals. The code generator 814 is described further in greater detail (see FIG. 9 and the description thereof).

As best seen in FIG. 8, coding and correction signal generation subpart 830 comprises a set 832 of analog-to-digital (A/D) converters, a summer 834, a sample/hold/accumulate register 836, a matrix decoding system 838, and integrators 840b-840e. The A/D converters 832 receive output signals 732a-732h from the elements of the detector array 730. Any suitable A/D converters may be used. A/D converters 832 may be are described herein in plural terms and a separate A/D converter may be provided for each of the detectors in the detector array. Alternatively, a single higher-performance A/D converter could be multiplexed to serve all of the detectors. The data rate for the A/D converters will depend on (a) the number of channels; (b) the desired maximum servoloop bandwidth; (c) the size (i.e., width in bits) of the code words used to distinguishably encode each beamlet; (d) any per-bit oversampling used in acquiring the beamlet error signals; and (e) whether plural, detector-associated A/D converters are used in parallel or a single A/D converter is multiplexed to serve all of the detectors. The bandwidths of the expected tilt error disturbances are in the audio range—up to several KHz. Accordingly, the digital frame rate should be a factor of 5 or 10 larger than desired bandwidth. In order to discriminate between the non-reference beamlets using Hadamard code words, the number of non-reference beamlets determines the minimum length of the code words used to encode the beamlets as follows: if the number of non-reference beamlets is a power of two, the minimum length is that same number of elements or bits; if the number of non-reference beamlets is not a power of two, the minimum length in elements or bits is the next larger power of two. However the length of the Hadamard code words need not be limited to this minimum length. For example four beamlets can be encoded by code words with eight elements for better discrimination.

As an example of determining the needed A/D converter bandwidth, assume that the desired servoloop bandwidth is 2 KHz. The resulting frame rate must be at minimum 5 times this number, or 10 KHz. Each code word has 8 code bits. Therefore the code bit rate is 80 KHz. If it is desired to oversample each bit 8 times, then the required A/D bandwidth is the product of this number times 80 KHz or 640 KHz. Current commercially available A/D converters are capable of operation at sampling rates exceeding 1 GSPS. The number of controlled beamlets could increase by a factor of at least 1000 (e.g., to 4000) before currently-available commercial A/D converters would become the limiting factor in the operation of the tilt error control system 130. By way of example, but not limitation, a commercially available A/D converter that could be used to implement A/D converters 832 is available from Analog Devices of Norwood, Mass. as type AD 9480; this is an 8-bit A/D converter that can operate at a conversion rate up to 250 MSPS.

The A/D converters 832 provide A/D converter output signals 850a-850g to summer 834, which calculates the total intensity of signal measured by the detectors. The summer effectively averages the detected interfered beam over the linear dimension of the detector array. Although the multiple detector elements collect information regarding the spatial variation of the interfered beam produced by optical processing part 136a, it is sufficient for tilt detection purposes to measure the total intensity of the interfered beam on the detector (excluding any portion of non-interfered beam). The summer 834 provides an output signal to a sample and hold accumulator 836 on lead 852.

Sample and hold accumulator 836 receives the summed detector output signals from summer 834 and supplies that information at appropriate times to the matrix decoding system 838. Due to detector noise and other factors causing the detected interference beam to vary over time, it is desirable to use a plurality of samples collected at different times for use in measuring tilt error. Accordingly, sample and hold accumulator 836 may accumulate a group of samples, such as eight, before releasing the sample information to the matrix decoding system 838, as directed by timing control signals of bus 816 from master clock and cycle timer 812. The accumulating function effectively averages the samples within the group, although it is not necessary that the accumulated sample be normalized by dividing it by the number of samples provided that the number of samples accumulated in each group is consistent. The accumulated sample value is provided to the matrix decoding system 838 via lead 854. This value includes a plurality of time-displaced samples from each of the elements of the detector array (e.g. eight samples from each of the eight detector elements).

Matrix decoding system 838 periodically receives accumulated sample values from the sample and hold accumulator 836. Matrix decoding system 838 uses this information to decode therefrom signals representative of the tilt error contributed by each of the non-reference beamlets 122b-122e. Each of the decoded tilt error contribution signals 856b-856e is furnished to a respective one of integrators 840b-840e to produce a corresponding one of beam steerer control signals 180b-180e. Appropriate integrator devices or circuits which may be used to implement integrators 840b-840e are known in the art. Beam steerer control signals 180b-180e are furnished to beam steerers 134b-134e. Although A/D converters 832, summer 834, sample and hold accumulator 836, matrix decoding system 838, and integrators 840b-e are depicted as separate devices, any one or more of them could be implemented as part of a computer-based control system.

Figure 9:
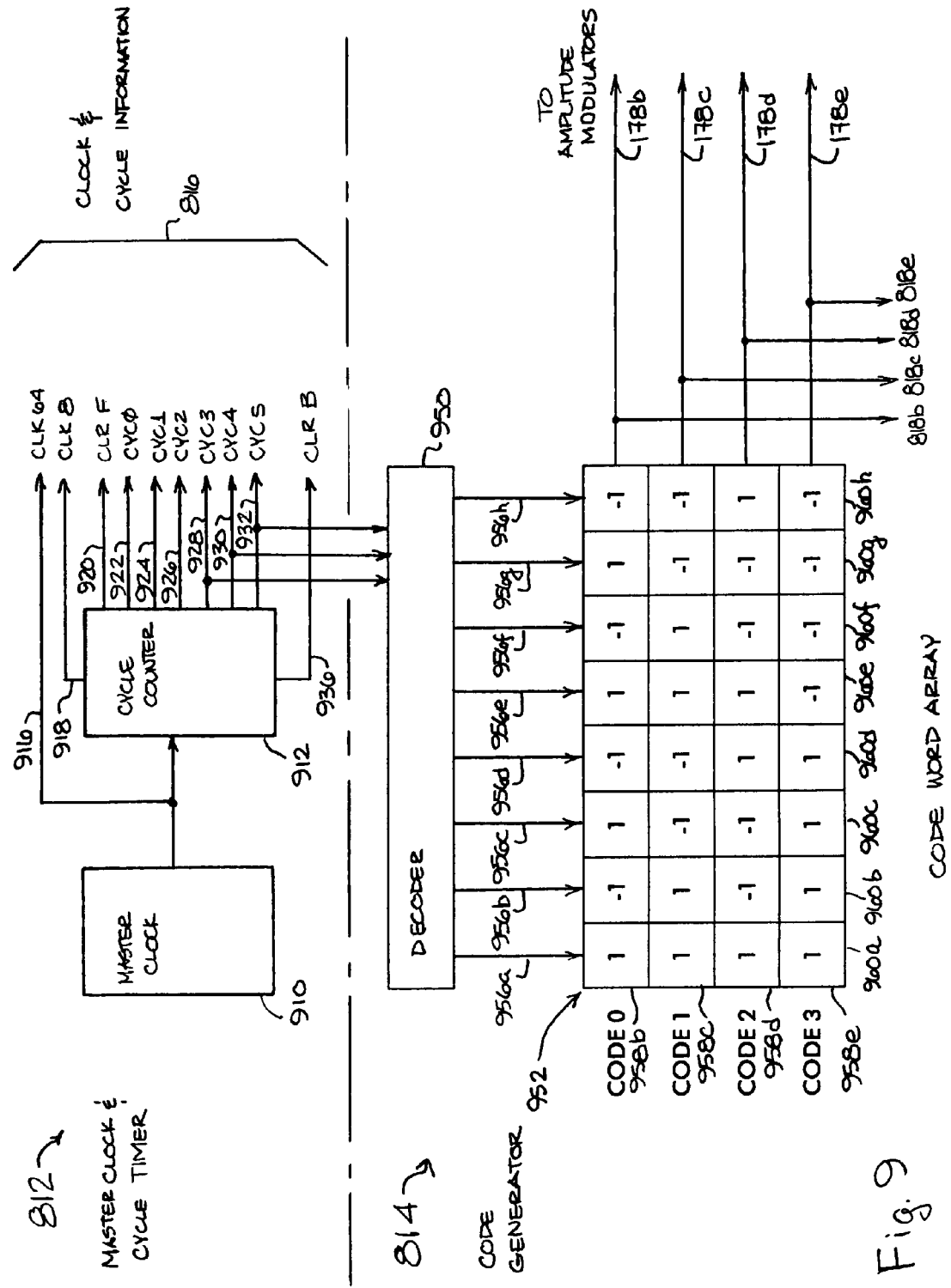
FIG. 9 is a block diagram showing a clock and code generation subpart 810 of the electrical processing part 136b of tilt error detection and processing unit 136 of FIGS. 1 and 8, for use with the tilt error control system 130 of laser system 100 of the present invention.

FIG. 9 depicts the clock and code generation subpart 810 in greater detail. The master clock and cycle timer 812 preferably comprises a master clock signal generator 910 and a cycle counter 912. The master clock signal generator 910 is a clock oscillator that defines the timing of the rest of electrical processing part 136b. As discussed further in greater detail, individual 8-bit repeating code words are used to modulate each of the non-reference beamlets 122b-122e. Each bit or element of the code is sequentially selected and transmitted (i.e., used for modulation of the non-reference beamlets) for 8 sample periods, to allow a plurality of samples to be collected and accumulated to minimize sampling noise and other unintentional variation over time. Accordingly, the master clock signal generator 910 produces a minor clock signal CLK64 on lead 916, each cycle of which defines a sampling period. Eight sample periods define the length of a bit of the code. 64 sampling periods and 64 cycles of the CLK64 signal, starting with the first bit and ending with the eight bit, define a "frame" or the period required to transmit a complete code word.

The cycle counter 912 receives the minor clock signal CLK64 916 and produces a number of derivative signals. A six-bit counter within cycle counter 912 produces a six-bit binary value representing a cycle number within a frame. The cycle number is presented as six cycle-count bit signals, starting with least-significant bit CYC0 922, and increasing in significance through CYC1 924, CYC2 926, CYC3 928, and CYC4 930, to the most-significant bit CYC5 932. The three most-significant bits CYC3 928, CYC4 930, and CYC5 932 identify the current code word bit number. A CLK8 signal 918 is asserted every eight minor cycles and identifies when the accumulated samples for the current code-word bit should be shifted into the matrix decoding system 838. A CLRB signal 936 is also asserted every eight minor cycles and identifies when the sample corresponding to the current code-word bit should be cleared from sample and hold accumulator 836. A CLRF signal 920 is asserted every 64 minor cycles, at the beginning of each frame, and identifies when each sample word should be cleared from registers in the matrix decoding system 838. Signals CLK64 916, CLK8 918, CLRF 920, CYC0 922, CYC1 924, CYC2 926, CYC3 928, CYC4 930, CYC5 932, and CLRB 936 form the clock and cycle information bus 816.

Code generator 814 generates an appropriate code which may be used to modulate each of the non-reference beamlets 122b-122e such that the tilt error contribution from each beamlet may be measured in a way that distinguishes that contribution from those of all other beamlets. The tagging or identification signal may, for example, be produced by associating with each beamlet one or more unique code words or vectors from a Hadamard dictionary, replacing code vector elements of value 0 with the value −1, and selecting in turn individual elements of such code vector to control the modulator on a periodic basis. Hadamard codes are easy to generate in groups with a number of members that is a power of 2. Because the reference beam is not tagged or identified, the number of beamlets must be odd.

Normally, Hadamard code sequences employ ones and zeros. As is known in the art, a Hadamard code vector is orthogonal to all other non-identical Hadamard code vectors, in the sense that when two non-identical Hadamard code vectors are compared, the sums of bits that are the same, minus the sum of bits that are different, normalized by the number of bits, is zero. The Hadamard code words can be modified to replace code word elements of value 0 with the value −1. For example, the following four code words: Code0=(1, −1, 1, −1, 1, −1, 1, −1); Code1=(1, 1, −1, −1, 1, 1, −1, −1); Code2=(1, −1, −1, 1, 1, −1, −1, 1); and Code3=(1, 1, 1, 1, −1, −1, −1, −1) could be used to encode non-reference beamlets 122b-122e respectively. By modifying the Hadamard code words to replace code vector elements of value 0 with the value −1, and normalizing the vector to unit length, the sum of the elements in a Hadamard code vector is zero, and any two such vectors are orthonormal. These properties allow a signal encoded with a Hadamard code vector to be distinguishably decoded in the presence of other such signals.

Code generator 814 comprises a decoder 950 and a code word array 952. The decoder 950 is a 3-line to 8-line decoder which receives the three most-significant cycle-count bits CYC3 928, CYC4 930, CYC5 932 and asserts one of eight decoded bit-select signals 956a-956h corresponding to the current code word bit number identified thereby. The code word array 952 stores a copy of each of the 8-bit code words Code0 through Code3 in rows 958b through 958e of the array, respectively, corresponding to non-reference beamlets 122b-122e. Each of columns 960a-960h corresponds to one of the code word bits enabled by the bit-select signals 956a-956h.

For each of the code words 958b-958e in the array, the array provides a corresponding output signal 818b-818e which contains the value of the selected bit of such code word. For example, code word 0 output signal 818b contains the value of the bit of Code0 which is currently selected by decoder 950. As the cycle counter 912 advances through bit numbers 0-7, each bit of Code0 is output in turn on code word 0 output signal 818b. The array behaves similarly with respect to code words Code1-Code3 958c-958e, supplying output signals 818c-818e. The output signals from code generator 814 and code word array 952 thereof are also supplied to the AM modulators 132b-132e as AM modulator control signals 178b-178e respectively.

FIG. 10 is a block diagram depicting coding and correction signal generation subpart 830, and in particular, matrix decoding system 838, in greater detail. As described earlier in connection with FIG. 8, detector elements 730a-730h provide detector output signals 732a-732h to A/D converters 832a-832h. The A/D converters 832a-832h provide A/D converter output signals 850a-850g to summer 834. The summer 834 totals the A/D converter output signals 850a-850g, effectively averaging the detected interfered beam over the linear dimension of the detector array. The output of the summer 834 is provided on lead 852 to sample and hold accumulator 836. Sample and hold accumulator 836 receives clock signal CLK64 916, and accepts and accumulates a sample from summer 834 once each minor cycle (eight times per code word bit period). The accumulator output signal 854 containing the accumulated sample value is furnished to matrix decoding system 838. Sample and hold accumulator 836 also receives bit clear signal CLR-B 936, which is active briefly at the end of each code word bit period, and which instructs the accumulator to clear its contents to enable it to accumulate samples corresponding to the next code word bit.

The matrix decoding system 838 comprises a decoder 1010 and a group of four tilt error decode matrices, each assigned to decode the tilt error contributions from one of the non-reference beamlets 122b-122e. The decoder 1010 is a 3-line to 8-line decoder which receives the three most-significant cycle-count bits CYC3 928, CYC4 930, CYC5 932 and asserts one of eight decoded bit-select signals 1020a-1020h corresponding to the current code word bit number identified thereby.

Each of the tilt error decode matrices comprises a sample register denoted 1012b-1012e, respectively, a code word register/multiplier denoted 1014b-1014e, respectively and a summer denoted 1016b-1016e.

Each of the sample registers 1012b-1012e is eight positions wide. Each of these eight positions is capable of receiving and storing the accumulated detector sample value corresponding to one code-word bit period as furnished by sample and hold accumulator 836. The bit select signals 1020a-1020e from decoder 1010 are provided to each of the sample registers 1012b-1012e. As the cycle counter advances through each code word bit and an accumulated sample value for that bit becomes available from sample and hold accumulator 836, the decoder 1010 asserts the corresponding one of the bit-select signals 1020a-1020h, and that value is stored in the corresponding bit position of sample registers 1012b-1012e.

Although each bit position corresponds to a code-word bit period, the value stored therein is not a binary value. Instead, this value represents all of the samples collected from the several detector elements during the sampling intervals occurring in one bit period. Thus, in the embodiment described herein, the value would represent eight detector elements, sampled eight times per bit period, for a total of 64 samples. The value may be stored in the form of an integer, a fixed point number, or a floating point number, or an analog (continuous-valued) quantity, depending on the particular types of detectors, post-detector signal processing, and the storage provided in the sample registers 1012b-1012e.

Each of the code word registers/multipliers 1014b-1014e is also 8 positions wide. Each of these eight positions is capable of receiving and storing one code word bit value provided by the code word array 814 (FIGS. 8-9) via code word output signals 818b-818e. The bit select signals 1020a-1020e from decoder 1010 are provided to each of the codeword registers 1014b-1014e. As the cycle counter advances through each code word bit interval, and a set of code word bits becomes available from the code generator 814, the decoder 1010 asserts the corresponding one of the bit-select signals 1020a-1020h, and that value is stored in the corresponding bit position of codeword registers/multipliers 1014b- 1014e. Each value may be a 1 or a −1. Thus, once the eighth codeword bit becomes available, each of the codeword registers/multipliers 1014b-1014e contains a corresponding complete codeword identical to that stored in code word array 952 and used to modulate a corresponding one of the non-reference beamlets 122b-122e.

Although the code word bits are described herein as being individually received from code generator 814 and "clocked" into each of the codeword registers/multipliers 1014b-1014e, other implementations could be used. For example, each of the codeword registers/multipliers 1014b-1014e could contain a permanent copy of the corresponding code word row 958b-958e of code word array 952.

Once a complete set of samples has been stored in all of the positions of the sample registers 1012b-1012e, and a complete codeword has been stored in codeword registers/multipliers 1014b-1014e, the codeword registers/multipliers 1014b-1014e perform a bit-position-wise multiplication of the sample values in the sample registers 1012b-1012e by the corresponding codeword values in the codeword registers/multipliers 1014b-1014e, and supply the results to the corresponding summers 1016b-1016e.

Consider, for example, the uppermost of the tilt error decode matrix shown in FIG. 10, assigned to decode the tilt error contributed by intermediate beamlet 122b, and including sample register 1012b, codeword register/multiplier 1014b, and summer 1016b. For each of the eight sample or code word bit positions in sample register 1012 and codeword register/multiplier 1014b, the codeword register/multiplier 1014b multiplies the corresponding accumulated sample value by the corresponding code word bit value, and furnishes this product to summer 1016b on a multiplier output signal bus 1022bb. Thus, the codeword register/multiplier 1014b performs eight multiplications, and the summer 1016b receives therefrom eight multiplication products. The summer 1016b determines the sum of the products and furnishes it to the corresponding integrator 840b.

The codeword register/multiplier 1014b and the summer 1016b effectively calculate the inner (dot) product of the bitwise-collected samples of the combined output beam tilt error and the bits of code word 958b used to modulate beamlet 122b. As noted earlier, a property of Hadamard code words is orthogonality: the inner product of any two non-identical Hadamard code words is zero. Thus, the calculated inner product furnished by summer 1016b represents nearly exclusively the tilt error contributed by beamlet 122b. Because each of the other non-reference beamlets 122c-122e is modulated using a different Hadamard code word, the inner products of code word 958b and the tilt error contributions of the other beamlets, which are modulated by such other code words, is nearly zero. Thus, decode matrix selects the tilt error contribution of beamlet 122b, and rejects the tilt error contributions of the other beamlets 122c-122e.

After the sum of products has been furnished to the integrator 840b, and responsive to the CLRF signal 920, sample register 1012b is cleared so that it may accept samples for the next frame. The codeword register/multiplier 1014b may be cleared at the same time.

A similar process occurs in each of the other tilt error decode matrices, respectively employing sample registers 1012c-1012e, codeword registers/multipliers 1014c-1014e, and summers 1016c-1016e.

For each of the non-reference beamlets 122b-122e the respective decoded tilt error contribution signal from the summers 1016b-1016e is furnished to a corresponding one of integrators 840b-840e. The integrated error signals are furnished to beam steerers 134b-134e as beam steerer control signals 180. The beam steerers move at a rate proportional to the magnitude control signals, and consistent with the sign thereof, forming a "Type I" servo loop. The update rate of the servo loop is the frame rate determined by the clock generator. One frame is equivalent to eight code word bits, which, in turn, is equivalent to 64 minor cycles. The servo loop bandwidth is typically 0.1 times the reciprocal of the frame rate.

The use of orthogonal Hadamard code words allows an arbitrary number of beamlet errors to be processed at the same time without crosstalk. Although the orthogonality of the Hadamard code words suggests that the tilt error components contributed by the other beamlets might be completely rejected, in practice, there will likely be some cross-talk as a result of a number of factors, including detector noise, conversion error, arithmetic precision error, and the time-varying nature of the tilt error components. However, it is believed that such cross-talk will be quite small, and even in the presence of cross-talk, the servo loops will still drive tilt error to zero, but at a slower rate. If code word cross talk were found to be a problem, one solution would be to modulate each beamlet in sequence, alone rather than simultaneously, so that encoded/modulated samples from only one beamlet are presented to the decoder at a time. This would result in a reduction in the servo loop bandwidth.

Although the processing of tilt error contributed by four non-reference beamlets is described herein, a larger number of beamlets than four could be accommodated in a straightforward manner. It would be necessary to lengthen the code words so that additional orthogonal code words could be generated. The width of code word array 952, sample registers 1012b-1012e, and codeword registers/multipliers 1014b-1014e would also be enlarged to accommodate the longer code words. In addition, the depth of code word array 952, and the number of tilt error decode matrices, would be enlarged to accommodate the additional number of code words to be decoded.

Because tilt error control system 130 employs amplitude modulation, the modulation has a smaller adverse impact on far-field beam quality than other beam tagging methods, such as phase modulation.

Figure 11:
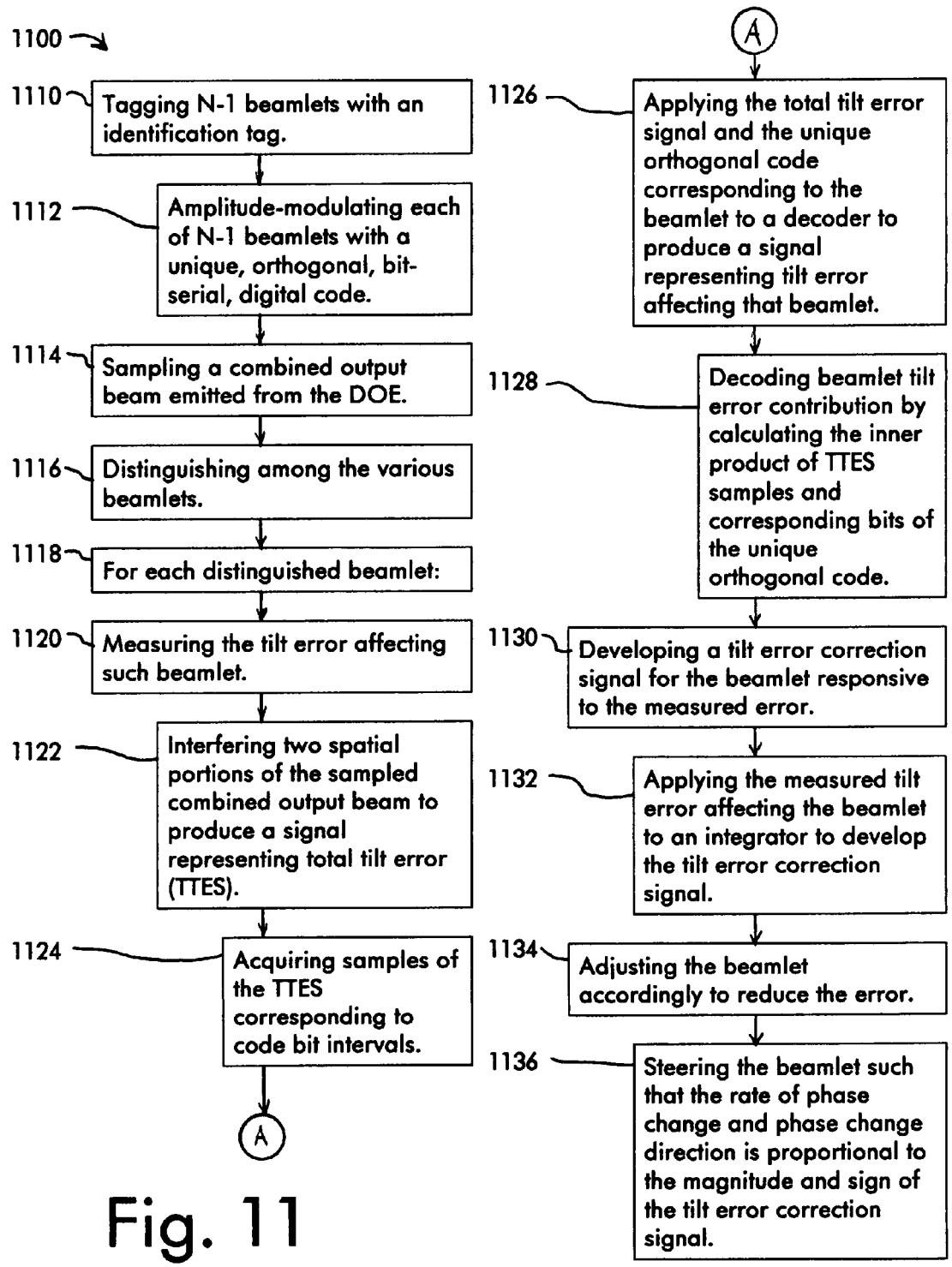
FIG. 11 is a flow diagram showing a method 1100 for use in conjunction with the laser system 100 of FIGS. 1 and 7-10 in controlling tilt error.

In accord with a further aspect of the present invention, FIG. 11 is a flow diagram of a method 1100 for use with the laser system 100 for use in controlling tilt error. One of skill in the art will appreciate that the method may be used with the apparatus of FIGS. 1 and 7-10, but could also be used with other apparatus and with other beamlet tagging techniques without departing from the spirit of the invention. Accordingly, some primary steps are presented in a generalized from that does not rely on the particular apparatus of FIGS. 1 and 7-10. It is noted in the description of certain steps and substeps that such steps may be performed by specific elements of the apparatus of FIGS. 1 and 7-10. The association of steps and apparatus is done by way of example but not limitation, and it is to be understood that these steps could be performed by other apparatus. Moreover, optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

In step 1110, the system tags each of at least N-1 beamlets with an identification tag code, or signal or the like, where N is the total number of beamlets. Because the central beamlet is assigned as a reference beamlet, then that beamlet may be defined to have zero correctible tilt error, and need not be tagged.

In an optional substep 612, the tagging of step 1110 is implemented by amplitude-modulating each of the N-1 beamlets with a unique, orthogonal, bit-serial, digital code, such as a Hadamard code. Other codes and beamlet tagging or identification techniques could also be used. Steps 1110 and 1112 may be performed, for example, by clock and code generation subpart 810 of electrical processing part 136b and by AM modulators 132 of FIGS. 1, 8, and 9.

In step 1114, a continuous, low-intensity sample of the combined output beam emitted from the DOE is obtained. Step 1114 may be performed, for example, by tilt error sampling beam splitter 138 of FIG. 1.

In step 1116, the system distinguishes among the various beamlets. In step 1118, beamlets are selected or isolated for further processing. Subsequent steps are performed with respect to each sampled beamlet, and may be performed for all beamlets in parallel, or may be performed for each beamlet in seriatim.

In step 1120, the system measures the tilt error contributed by a particular beamlet, distinguishing the tilt error contributed by the corresponding beamlet from that of other beamlets using the identification tag of step 1110. The term "measure" as used in connection with steps 1120, 1122, 1124, 1126, and 1128 is not intended to refer to a precise numerical value having significance outside of the tilt error control system 130. Instead, the term "measure" as used here refers to developing a signal representative of the error, and containing sufficient information for the tilt error control system 130 to effectively adjust or correct the tilt error. Although the measuring step, as implemented by the apparatus of FIGS. 1, and 7-10, produces a signal proportional to and having the sign of the error, other implementations could use other types of signals, including non-proportional or discrete-valued signals. Although such other types of signals may not provide the performance of a proportional signal, the control achieved by such other types of signals may nonetheless minimize the tilt error sufficiently for some applications. The functions of step 1120 may be performed, for example, by tilt error detection and processing unit 136.

In an optional substep 1122, the measuring of step 1120 is partially implemented by interfering two spatial portions of the sampled combined output beam to produce a signal representing total tilt error. The functions of step 1122 may be performed, for example, by optical processing part 136a of tilt error detection and processing unit 136.

In an optional substep 1124, the measuring of step 1120 is further partially implemented by acquiring samples of the total tilt error signal at intervals corresponding to those during each bit of the tagging or identification code is used to modulate the beamlets. The functions of step 1124 may be performed, for example, by A/D converters 832, summer 834, and sample and hold accumulator 836 of FIGS. 8 and 10.

In an optional substep 1126, the measuring of step 1120 is further partially implemented by applying the total tilt error signal and the unique orthogonal code corresponding to the distinguished beamlet to a decoder to produce a signal representing tilt error affecting or contributed by that beamlet. The functions of step 1126 may be performed, for example, by matrix decoding system 838 of FIGS. 8 and 10.

In an optional substep 1128, the process of producing a signal representing tilt error contributed by a beamlet of step 1126 is partially implemented by decoding the tagging or identification signal which have been used to modulate the beamlet and which now encodes the tilt error contribution of the beamlet within the total tilt error signal. This is performed by calculating the inner product of the bits of the unique orthogonal code used to modulate the beamlet during one code word frame, with the total tilt error signal samples acquired at the time those bits were used. The functions of step 1128 may be performed, for example, by sample registers 1012b-1012e, codeword registers/multipliers 1014b-1014e, and summers 1016b-1016e of FIG. 10.

In step 1130, the system develops a tilt error correction signal for the beamlet responsive to the measured error. In an optional substep 1132, the error correction signal development of step 1130 may be implemented by applying the measured tilt error affecting the beamlet to an integrator to develop the tilt error correction signal. The function of step 1132 may be performed, for example, by integrators 840b-840e of FIGS. 8 and 10.

In step 1134, the system adjusts the beamlet in accord with the tilt error correction signal of step 1130 to reduce the tilt error contributed by that beamlet. In an optional substep 1136, the adjusting of step 1134 may be implemented by steering the beamlet such that the rate of change and change direction is proportional to the magnitude and sign of the tilt error correction signal. The function of steps 1134 and 1136 may be performed, for example, by beam steerers 134b-134e which can introduce an angular displacement of non-reference beamlets 122b-122e and thereby adjust the entry angle of the beamlet with respect to the DOE 160.

The steps or operations described herein are just for example. There may be many variations to these steps or operations without departing from the spirit of the invention. For instance, the steps may be performed in a differing order, or steps may be added, deleted, or modified.

Thus, there has been described an improved high-power laser system which includes a laser master oscillator, a plurality of fiber laser amplifiers producing intermediate output beamlets, a diffractive optical element for combining the intermediate beamlets into a combined output beam, and one or more error controllers for minimizing errors related to beam combination that may degrade the quality of the combined output beam. A diffractive optical element (DOE) is a special type of coarse grating having a specifically designed grating profile or shape, which is capable of combining the plurality of intermediate beamlets into a single combined output beam. Each of piston error and tilt error, if present, causes the emission from the DOC of undesired secondary beamlets which rob power from and reduce the quality of the desired primary combined output beam.

A piston error controller provides for each intermediate beamlet a unique dithering signal used to phase modulate the beamlet before combination. The phase modulation tags each beamlet (other than a defined reference beamlet) with the corresponding dither signal, such that after combination, contributions from such beamlet can be distinguished from those of other beamlets. A sample of the combined output beam is processed to produce for each intermediate beamlet a control signal proportional to the magnitude and sign of the piston error. This control signal is used (in addition to the low-amplitude dither signal) to phase modulate the corresponding beamlet, thus correcting the piston error.

A tilt error controller provides for each non-reference beamlet a tagging signal with which the beamlet is amplitude-modulated prior to combining. The tagging signal allows the contribution of each beamlet to tilt error artifact in the combined output signal to be distinguished from that of other beamlets. The tilt error controller obtains a sample of the combined output beam, and applies an interferometry technique to produce an optical signal proportional to tilt error. The optical signal is captured by a sensor, decoded to distinguish among contributions from the various beamlets, and for each non-reference beamlet, generates an error control signal proportional to the measured the tilt error. Each error control signal is used to control a corresponding beamlet steerer. The tagging signal may be produced by associating with each beamlet one or more unique code words or vectors from a Hadamard dictionary.

The piston error control system and tilt error control system advantageously minimize the production of secondary beamlets exiting the DOE beam combiner, thereby maximizing the energy in the primary combined output beam and improving beam quality. Each error control system is relatively resistant to crosstalk among beamlets, but due to the nature of the controllers as first-order servo-loops, the error will eventually converge to zero despite the crosstalk, albeit perhaps at a slower rate.

Although this invention has been described as it could be applied to a laser system employing fiber laser amplifiers with intermediate beamlets combined by a DOE beam combiner, these are merely examples of ways in which the invention may be applied. The invention is not limited to these examples, and could be applied to many other environments.

The embodiments described herein are exemplary. Thus it will be appreciated that although the embodiments are described in terms of specific technologies, other equivalent technologies could be used to implement systems in keeping with the spirit of the present invention.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A laser system comprising:

a master oscillator;

a plurality of amplifiers, each optically coupled to the master oscillator and each producing, responsive to a signal therefrom, a respective monochromatic beamlet, each monochromatic beamlet contributing a respective beamlet error;

a diffractive optical element optically coupled via a converging lens to each of the plurality of amplifiers to receive said respective monochromatic beamlet therefrom, wherein said beamlets are converged on the diffractive optical element via the converging lens, said diffractive optical element producing a combined output beam responsive to said monochromatic beamlets, said combined output beam exhibiting a combined error characteristic resulting from said beamlet errors; and an error control system adapted to measure from a sample of said combined output beam one of said beamlet errors contributed by a specific one of said monochromatic beamlets as distinct from said beamlet errors contributed by all other monochromatic beamlets and to adjust a characteristic of said one specific monochromatic beamlet so as to substantially minimize said one beamlet error;

said error control system comprising:

a code generator adapted to generate for each of a selected plurality of said monochromatic beamlets a unique repeating code word having a plurality of code elements; and for each of said selected plurality of monochromatic beamlets an amplitude modulator interposed in each of said monochromatic beamlets and responsive to said code generator such that each of said monochromatic beamlets is modulated with the corresponding unique code word.

2. The laser system of claim 1 wherein said error control system further comprises:
  a sampling component interposed in said combined output beam and adapted to collect a low-intensity sample thereof; and
  an optical processing element responsive to said combined output beam sample and adapted to interfere a first spatial portion of said combined output beam sample with a second portion thereof to produce a signal representative of the total tilt error contributed by all of said selected plurality of monochromatic beamlets.

3. The laser system of claim 2 wherein said error control system further comprises:
  for each of said selected plurality of monochromatic beamlets, a processing element responsive to said unique repeating code word and said total tilt error signal for decoding said unique repeating code word contained in said total tilt error signal to produce a signal representing tilt error contributed by such monochromatic beamlet as distinct from tilt errors contributed by all others of said selected plurality of monochromatic beamlets.

4. The laser system of claim 3 wherein said processing element further comprises a decoding matrix responsive said total tilt error signal and said repeating code word, said decoding matrix adapted to calculate, for each instance of said repeating code word and periodic samples of said total tilt error signal corresponding in time with said instance, an inner product thereof, to produce said signal representing tilt error contributed by such monochromatic beamlet.

5. A laser system comprising:
  a master oscillator;
  a plurality of amplifiers, each optically coupled to the master oscillator and each producing, responsive to a signal therefrom, a respective monochromatic beamlet, each monochromatic beamlet contributing a respective beamlet error,
  a diffractive optical element optically coupled via a converging lens to each of the plurality of amplifiers to receive said respective monochromatic beamlet therefrom, wherein said monochromatic beamlets are converged on the diffractive optical element via the converging lens, said diffractive optical element producing a combined output beam responsive to said monochromatic beamlets, said combined output beam exhibiting a combined error characteristic resulting from said beamlet errors; and
  an error control system adapted to:
  measure from a sample of said combined output beam one of said beamlet errors contributed by a specific one of said monochromatic beamlets as distinct from said beamlet errors contributed by all other monochromatic beamlets and to adjust a characteristic of said one specific monochromatic beamlet so as to substantially minimize said one beamlet error;
  define one of said monochromatic beamlets as a reference beamlet; and
  for each of said monochromatic beamlets other than said reference beamlet, tag such beamlet with an identifying signal before such beamlet is combined with other beamlets, such that after all beamlets are combined, an error characteristic contributed by such beamlet is measurable distinctly from error contributions contributed by all other beamlets.

6. The laser system of claim 5 wherein said error control system is further adapted to tag each of said monochromatic beamlets other than said reference beamlet by amplitude-modulating said monochromatic beamlet with sequentially selected elements of a respective unique code word which is orthogonal to code words used to modulate any other of said monochromatic beamlets.

7. The laser system of claim 6 wherein said error control system is further adapted to measure said error characteristic contributed by such monochromatic beamlet by decoding said contribution using said respective unique code word.

8. The laser system of claim 5 wherein said error control system is further adapted to tag each of said monochromatic beamlets other than said reference beamlet by amplitude-modulating said monochromatic beamlet with sequentially selected elements of a Hadamard-dictionary code word unique to such monochromatic beamlet.

9. A laser system comprising:
  a master oscillator;
  a plurality of amplifiers, each optically coupled to the master oscillator and each producing, responsive to a signal therefrom, a respective monochromatic beamlet, each monochromatic beamlet contributing a respective beamlet tilt error;
  a diffractive optical element optically coupled via a converging lens to each of the plurality of amplifiers to receive said respective monochromatic beamlet therefrom, wherein said monochromatic beamlets are converged on the diffractive optical element via the converging lens, said diffractive optical element producing a combined output beam responsive to said monochromatic beamlets, said combined output beam exhibiting a combined error characteristic resulting from said beamlet errors; and
  a tilt error control system adapted to measure from a sample of said combined output beam a beamlet tilt error contributed by a specific one of said monochromatic beamlets as distinct from beamlet tilt errors contributed by all other monochromatic beamlets and to adjust an entry angle characteristic of said specific one beamlet so as to minimize said contributed beamlet tilt error.

10. The laser system of claim 9 wherein said tilt error control system further comprises:
  a beam splitter interposed in said combined output beam and producing a combined output beam sample;
  a tilt error detection and processing unit optically coupled to said beam splitter and adapted to receive said combined output beam sample; and
  for each of said monochromatic beamlets other than a defined reference beamlet, an amplitude modulator interposed in such beamlet and coupled to said tilt error detection and processing unit, and a beam steerer interposed in such beamlet and coupled to said tilt error detection and processing unit;
  wherein said tilt error detection and processing unit is adapted to generate, responsive to said measured beamlet tilt error contributed by said specific one beamlet, a tilt error control signal and to provide said control signal to said beam steerer interposed in said specific one beamlet; and
  said beam steerer is adapted to adjust an entry angle characteristic of said specific one beamlet to reduce said contributed tilt error.

11. The laser system of claim 10 wherein said tilt error control system is adapted to measure, for each of said monochromatic beamlets other than a defined reference beamlet, tilt error contributed by such monochromatic beamlet, and responsive thereto, to generate a respective tilt error control signal for such monochromatic beamlet, and to provide such signal to the corresponding one of said beam steerers interposed in such beamlet.

12. The laser system of claim 9 wherein said tilt error control system further comprises:
  for each of said monochromatic beamlets other than a defined reference beamlet, a generator producing a unique code word, said code word being orthogonal to code words generated for any other monochromatic beamlet;
  wherein said tilt error control system is adapted to modulate such monochromatic beamlet with said unique code word before combination.

13. The laser system of claim 12 wherein said tilt error control system further comprises:
  a decoding system responsive to said combined output beam sample and said code word to produce an error signal proportional to and in the same direction as the tilt error contributed by such monochromatic beamlet.

14. The laser system of claim 13 wherein said tilt error control system further comprises:
  an integrator responsive to said error signal for producing a control signal for use by the corresponding beam steerer to reduce said tilt error contributed by such monochromatic beamlet.

15. The laser system of claim 13 wherein said decoding system further comprises an optical processing element responsive to said combined output beam sample and adapted to interfere a first spatial portion of said combined output beam sample with a second spatial portion thereof to produce a signal representative of the total tilt error contributed by all of said selected plurality of monochromatic beamlets.

16. The laser system of claim 15 wherein said decoding system further comprises a decoding matrix responsive to said total tilt error signal and said repeating code word, said decoding matrix being adapted to calculate, for each instance of said code word and periodic samples of said total tilt error signal corresponding in time with said instance, an inner product thereof, to produce said signal representing tilt error contributed by said monochromatic beamlet.

17. A method for controlling an error characteristic in a laser system comprising the steps of:
  tagging a plurality of monochromatic beamlets produced by laser amplifiers prior to beam combination via a converging lens with an identification tag;
  sampling a combined output beam resulting from combining said plurality of monochromatic beamlets;
  from said sampled combined output beam, measuring a tilt error affecting one of said beamlets distinct from tilt errors affecting any other of said beamlets;
  generating an error correction signal to reduce said tilt error of one of said beamlets responsive to said measured tilt error; and
  adjusting a physical characteristic of said one beamlet accordingly to reduce the tilt error.

18. The method of claim 17 wherein said tagging step thereof further comprises amplitude modulating during a period each of said plurality of monochromatic beamlets with a unique code word orthogonal to any of the code words used to modulate any of the other monochromatic beamlets during said period.

19. The method of claim 18 wherein said measuring step thereof further comprises applying the sampled combined output beam and the unique code word corresponding to said monochromatic beamlet to a decoding system.

20. The method of claim 18 wherein said measuring step thereof further comprises interfering two spatial portions of the sampled combined output beam to produce a signal representing total tilt error.

21. The method of claim 20 wherein said measuring step thereof further comprises:
  acquiring periodic samples of the total tilt error signal corresponding in time to elements of the unique code word corresponding to the beamlet;
  applying the total tilt error signal samples and the unique code word corresponding to the beamlet to a decode matrix; and
  for each temporal instance of the unique code word, calculating the inner product of said code word and those periodic total tilt error signal samples corresponding in time to such instance to produce said measurement of the tilt error affecting said beamlet.

22. The method of claim 17 wherein said generating step thereof further comprises applying the measured tilt error affecting said one beamlet to an integrator to develop the tilt error correction signal.

23. The method of claim 17 wherein said adjusting step thereof further comprises adjusting an entry angle of said one beamlet such that the rate of entry angle change and entry angle change direction are proportional to the magnitude and sign of the tilt error correction signal.

* * * * *